(12) United States Patent
Kothari et al.

(10) Patent No.: US 8,429,209 B2
(45) Date of Patent: Apr. 23, 2013

(54) METHOD AND SYSTEM FOR EFFICIENTLY READING A PARTITIONED DIRECTORY INCIDENT TO A SERIALIZED PROCESS

(75) Inventors: Mitul Kothari, Pune (IN); Brad Boyer, San Jose, CA (US); Anindya Banerjee, Pune (IN); Kedar Patwardhan, Maharashtra (IN); Ryan Robert Lefevre, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 140 days.

(21) Appl. No.: 12/857,441

(22) Filed: Aug. 16, 2010

(65) Prior Publication Data

US 2012/0041923 A1 Feb. 16, 2012

(51) Int. Cl.
*G06F 12/00* (2006.01)

(52) U.S. Cl.
USPC .......................................... 707/822; 711/115

(58) Field of Classification Search .................. 707/822, 707/831
See application file for complete search history.

(56) References Cited

U.S. PATENT DOCUMENTS

| | | | |
|---|---|---|---|
| 2003/0005217 A1* | 1/2003 | Chang et al. | 711/111 |
| 2004/0003086 A1 | 1/2004 | Parham et al. | |
| 2004/0215900 A1 | 10/2004 | Guthrie et al. | |
| 2005/0073571 A1 | 4/2005 | Pan et al. | |
| 2005/0149749 A1 | 7/2005 | Van Brabant | |
| 2006/0080674 A1 | 4/2006 | Bes et al. | |
| 2007/0083715 A1 | 4/2007 | Vanderpool | |
| 2007/0226320 A1* | 9/2007 | Hager et al. | 709/219 |
| 2008/0071811 A1 | 3/2008 | Parkinson et al. | |
| 2008/0244189 A1 | 10/2008 | Allison et al. | |
| 2009/0019514 A1 | 1/2009 | Hazlewood et al. | |
| 2009/0143046 A1 | 6/2009 | Smith | |
| 2009/0178105 A1 | 7/2009 | Feng et al. | |
| 2009/0178106 A1 | 7/2009 | Feng et al. | |
| 2009/0204571 A1 | 8/2009 | Shizuno | |
| 2010/0057697 A1 | 3/2010 | Golwalkar et al. | |
| 2011/0082879 A1 | 4/2011 | Hazlewood et al. | |
| 2011/0307543 A1 | 12/2011 | Megginson | |

* cited by examiner

*Primary Examiner* — Amy Ng
(74) *Attorney, Agent, or Firm* — Wilmer Cutler Pickering Hale and Dorr LLP

(57) ABSTRACT

A method of reading data from a partitioned directory incident to a serialized process. A first read and an offset value are received. A first data block in a modeled fully partitioned directory is identified based on the offset value and a predetermined number of entries associated with a buffer. It is determined whether the first data block in the fully partitioned directory is present in the actual partitioned directory. Zeros are written in the buffer if the first data block in the fully partitioned directory is not present in the actual partitioned directory otherwise the first data block associated with the actual partitioned directory is written to the buffer. A second data block is similarly read by a second read operation and written. The second data block is associated with a second subdirectory, selected based on a horizontal node traversal at a node level of said first subdirectory.

20 Claims, 21 Drawing Sheets

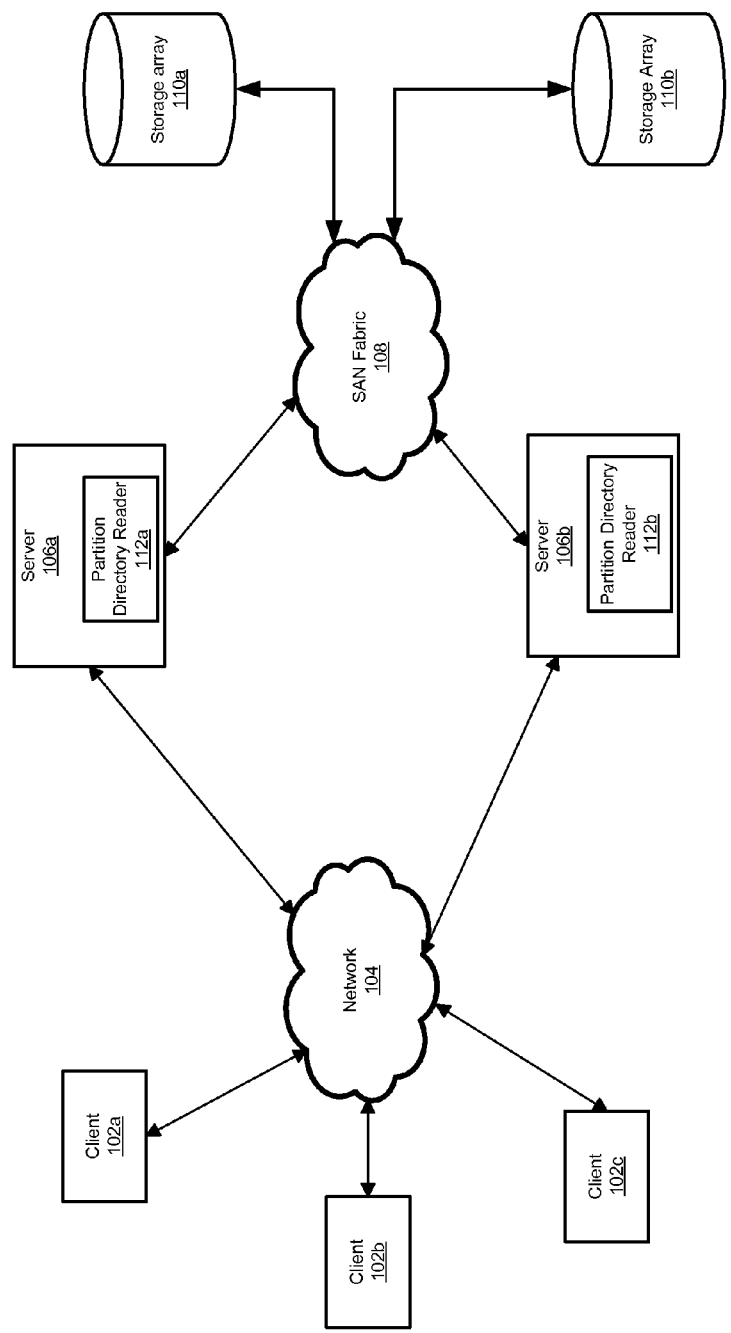

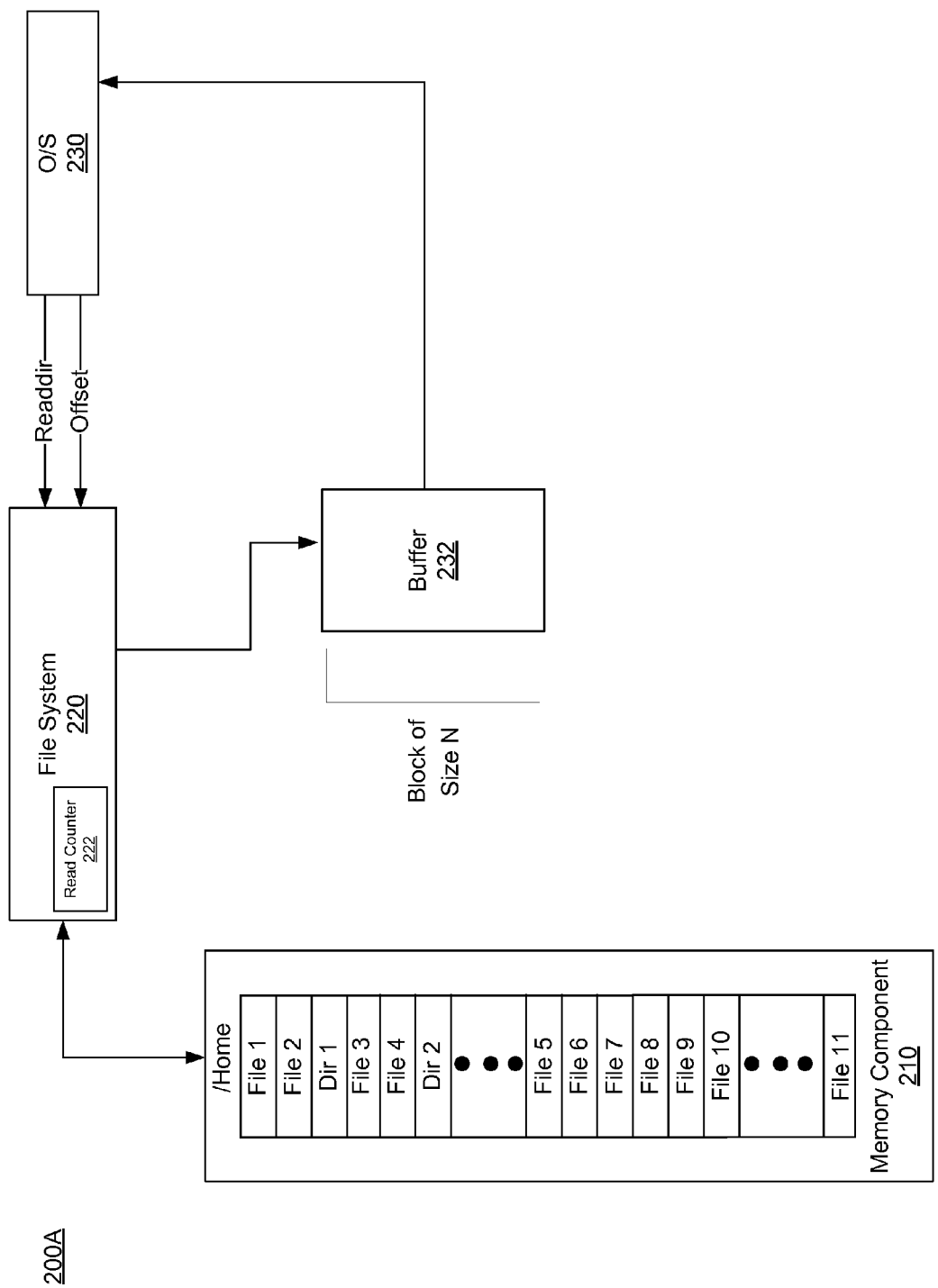

METHOD AND SYSTEM FOR EFFICIENTLY READING A PARTITIONED DIRECTORY INCIDENT TO A SERIALIZED PROCESS

TECHNICAL FIELD

Embodiments of the present invention generally relate to computers facilitating a read operation associated with a partitioned directory.

BACKGROUND

It is common for threads to become serialized with processes to read entire directories within a storage system. In general, such a read operation from a directory, e.g., a "/home" directory, involves an operating system, a file system and a memory component that stores the /home directory. The operating system provides a buffer and transmits an offset along with the read request to the file system. The file system, based on the offset, reads a data block stored in the /home directory. The file system writes the read data in to the buffer and updates the offset value.

The operating system receives the updated offset value and transmits the updated offset value along another serial read request. The file system, based on the updated offset value, reads another data block from the /home directory and writes the read data into the buffer. This process continues until all the desired data is read from the directory once and only once.

One type of conventional serialized process places an exclusive lock on the directory being read, therefore, other processes are not able to use the directory while the exclusive lock is in place. This is not efficient. Increased computer usage and the Internet has led to an increase in content sharing including sharing files within directories. In other words, files within a directory may be accessed by one or more users, applications, clients, etc., simultaneously or serially. Unfortunately, exclusive access requests to files within the /home directory prevent the data from being shared with other types of requests.

Partitioning a directory helps to increase efficiency by allowing some partitions of the directory to be shared while others are being exclusively accessed. In order to accommodate exclusive access requests as well as other types of requests simultaneously, a directory may be partitioned. For example, the /home directory may be partitioned into additional subdirectories in order to facilitate multiple exclusive accesses simultaneously.

Unfortunately, partitioning the /home directory may cause a newly created entry to be missed during the read operation or if the directory is partitioned during a read operation, it may cause an entry to be read twice due to shuffling of the entries associated with the partitioning. Therefore, while partitioning of a directory may improve directory accessibility incident to a serialized process, it has the disadvantage of potentially missing a file in the read operation, e.g., listing operation, readdir operation, gedents operation, etc., or reading a file more than once and reporting it more than once to the operating system.

SUMMARY

Accordingly, a need has arisen to provide directory partitioning but to read entries of a partitioned directory only once during a serialized process. Furthermore, it is advantageous to read content from a partitioned directory in a manner that increases the chances of accurately capturing and reporting any newly added entries of the directory. It will become apparent to those skilled in the art after reading the detailed description of the present invention that the embodiments of the present invention satisfy the above mentioned needs.

In one embodiment, a file system receives a read operation request and an offset value from the operating system incident to a serialized process, for instance. The file system identifies a first data block to be read based on the offset value and further based on the size of the buffer provided by the operating system. The file system identifies the first data block to be read by using the offset value and the size of the buffer in a fully partitioned directory. The fully partitioned directory is pictorially represented as a tree structure with the maximum number of allowed levels and nodes. The first data block is read and written to the buffer if the identified first data block is also present in the actual partitioned directory. Otherwise, in one embodiment, zeros are written into the buffer. It is appreciated that the file system updates the offset value and passes the updated offset value to the operating system.

The operating system passes the updated offset value and sends another read operation request to the file system. The file system identifies the next data block to be read in a similar fashion. The next data block is in a subdirectory immediately following the subdirectory associated with the previous read operation in a fully partitioned directory. In other words, data blocks from subdirectories in a fully partitioned tree structure are read by the file system consecutively in a horizontal and round-robin fashion. The read data blocks are written to the buffer one after another. It is appreciated that zeros may be written for the remainder of the buffer if a number of read entries of a given data block is less than a number of entries in the buffer.

The combination of reading content of each subdirectory in a horizontal and round-robin fashion and updating the offset value ensure that each entry is read only once, thereby eliminating duplicate and redundant read operations. Moreover, new entries are usually added at the end of each subdirectory. Accordingly, the newly added entries are captured by subsequent read operations because they are added at the end of each subdirectory and they are read last due to the combination of reading the data blocks horizontally and in a round-robin fashion. Furthermore, writing zeros for the remainder of the buffer if the number of read entries is less than the number of entries in the buffer ensures that offset values identify a unique data block in a particular subdirectory.

More particularly, a directory may be partitioned prior to reading content from the partitioned directory. According to one embodiment, reading content in an actual partitioned directory includes receiving a read operation and an offset value from an operating system. A first data block in a fully partitioned directory is identified, wherein the first data block is associated with a first subdirectory, and wherein the identifying is based on the offset value and further based on a predetermined number of entries associated with a buffer of the operating system. It is determined whether the first data block in the fully partitioned directory is present in the actual partitioned directory. Null values (e.g., zeros, etc.) are written in the buffer if the first data block in the fully partitioned directory is not present in the actual partitioned directory.

The first data block associated with the actual partitioned directory is read if the first data block in the fully partitioned directory is present in the actual partitioned directory and the first data block associated with the actual partitioned directory is written in the buffer in response to the reading of the first data block. Null values may be written for a remainder of the buffer if a number of read entries in association with the first data block of the actual partitioned directory is less than the predetermined number of entries associated with the buffer. It is appreciated that the file system updates the offset value and passes the updated offset value to the operating system.

According to one embodiment, subsequent to the writing, the updated offset value is received from the operating system. It is appreciated that the updated offset value may be accompanied with a new read request. A second data block in a fully partitioned directory is identified, wherein the second data block is associated with a second subdirectory, wherein the second subdirectory is pictorially adjacent to the first subdirectory if the fully partitioned directory is drawn as a tree structure, and wherein the identifying is based on the updated offset value and further based on a predetermined number of entries. It is determined whether the second data block in the fully partitioned directory is present in the actual partitioned directory. According to one exemplary embodiment, null values are written in the buffer if the second data block in the fully partitioned directory is not present in the actual partitioned directory.

According to one embodiment, the second data block associated with the actual partitioned directory is read if the second data block in the fully partitioned directory is present in the actual partitioned directory and the second data block associated with the actual partitioned directory is written in the buffer in response to the reading of the second data block. Null values are written for a remainder of the buffer if a number of read entries in association with the second data block of the actual partitioned directory is less than the predetermined number of entries associated with the buffer.

BRIEF DESCRIPTION OF THE DRAWINGS

FIG. 1 shows a block diagram of an exemplary computer system operating environment that may serve as a platform in accordance with one embodiment of the present invention.

FIGS. 2A-2G show exemplary embodiments associated with reading entries of a fully partitioned directory pursuant to a serialized process in accordance with embodiments of the present invention.

DETAILED DESCRIPTION

Figure 2B:
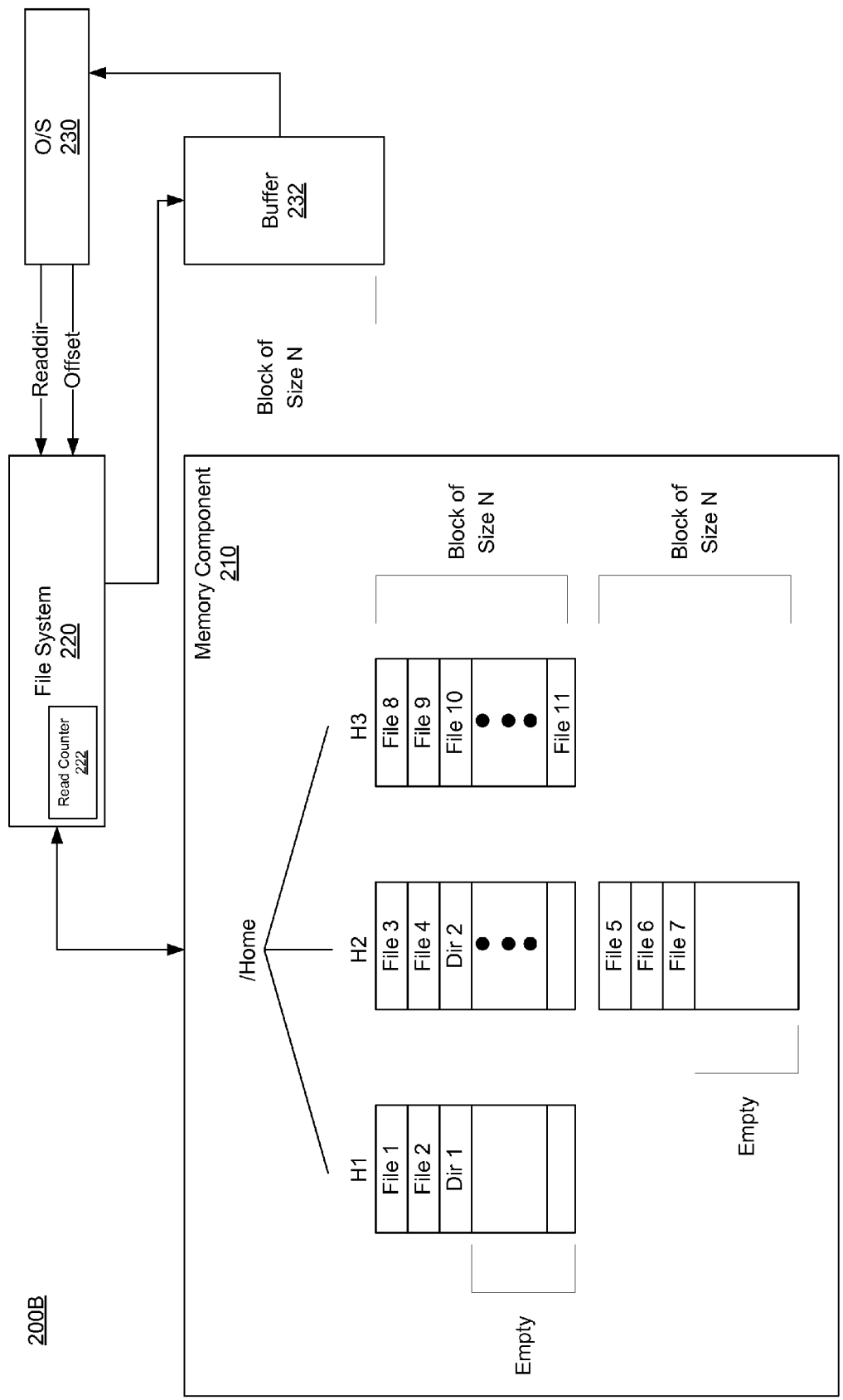

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "receiving," "storing," "determining," "sending," "providing," "accessing," "associating," or "reading" or "writing" or "partitioning" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment in which various embodiments of the present invention can operate. Exemplary operating environment 100 includes clients 102a-c, networks 104, servers 106a-b, storage area network (SAN) fabric 108, and storage arrays 110a-b. It is appreciated that that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b may communicate with each other over a network (e.g., a redundant private network) (not shown). Servers 106a-b may be linked to storage arrays 110a-b in a variety of ways including, fibre channel.

Servers 106a-b may respectively use partition directory readers 112a-b, in accordance with embodiments of the present invention, that are operable to read content from a partitioned directory such that entries within the partitioned directory are read only once incident to a serialized process. One such serialized process is the READDIR operation, for instance. Furthermore, the partitioned directory readers 112a-b, in accordance with embodiments of the present invention, are operable to effectively capture and report most of any newly added entries to the operating system that were newly added with reference to the execution time of the serialized process.

The partitioned directory readers 112a-b receive a read operation request and an offset value from the operating system (incident to a serialized read process). The partitioned directory readers 112a-b identify a first data block to be read based on the offset value and further based on the size of the buffer provided by the operating system. The partitioned directory readers 112a-b identify the first data block to be read by using the offset value and the size of the buffer in a fully partitioned directory. The fully partitioned directory is a model of the actual partitioned directory and it is pictorially represented as a tree structure with maximum number of allowed levels and nodes that are possible for (but not necessarily present in) the actual partitioned directory. The first data block is read and written to the buffer if the identified first data block is also present in the actual partitioned directory. Otherwise, null values, e.g., zeros, are written into the buffer. It is appreciated that the file system updates the offset value and passes the updated offset value to the operating system.

The operating system transmits the updated offset value and sends another read operation request to the partitioned directory readers 112a-b. The partitioned directory readers 112a-b identify the next data block to be read in a similar fashion. The next data block is in a subdirectory immediately following the subdirectory associated with the previous read operation in a fully partitioned directory. In other words, data blocks from subdirectories in a fully partitioned tree structure are read by the file system consecutively in a horizontal and round-robin fashion. The read data blocks are written to the buffer one after another. It is appreciated that null values, e.g., zeros, are written for the remainder of the buffer if a number of read entries of a given data block is less than a number of entries in the buffer.

The combination of reading content of each subdirectory in a horizontal and round-robin fashion and updating the offset value ensure that each entry is read only once. Moreover, new entries are usually added at the end of each subdirectory. Accordingly, almost all of any newly added entries are captured because they are added at the end of each subdirectory and they are read last due to reading the data blocks horizontally and in a round-robin fashion. Furthermore, writing null values for the remainder of the buffer if a number of read entries is less than a number of entries in the buffer ensures that offset values identify a unique data block in a particular subdirectory.

A Method and System for Efficiently Reading a Partitioned Directory Incident to a Serialized Process Referring now to FIGS. 2A-2G, exemplary embodiments are shown associated with efficiently and effectively reading entries of a fully partitioned directory incident to a serialized process in accordance with embodiments of the present invention. Referring specifically to FIG. 2A, system 200A is shown and includes a memory component 210, a file system 220 and an operating system (O/S) 230.

The memory component 210 stores content. For example, the memory component 210 is shown storing a "/home" directory containing exemplary File 1, File 2, Dir 1, File 3, . . . , File 11 entries. It is appreciated that the /home directory shown is not partitioned. The operating system provides a buffer 232 to the file system 230. The buffer 232 may be of any size, for example 1024 entries, but is generically referred to as size N hereinafter. The buffer 232 is associated with the operating system 230.

According to one embodiment, the operating system 230 may send a read operation request along with an offset to the file system 220 as part of a serialized process or thread. The file system 220 uses the offset value to identify the content to be read from the /home directory. The file system 220 reads N number of entries from the identified content within the /home directory and places the read content in to the buffer 232. The buffer 232 is passed back to the operating system 230. The file system 220 updates the offset by N and passes the updated offset value to the operating system 230. As part of the serialized process, the operating system 230 sends another read operation along with the updated offset to the file system 220 and the process is repeated until the entire content of the /home directory is read only once. During this read operation, the directory is under an exclusive lock and its contents are prevented from being shared during the serialized process.

It is appreciated that the file system 220 may determine that efficiency is improved if the /home directory is partitioned so that some of the content can be shared during the above described read operation. It is, however, appreciated that partitioning should not take place during the execution of a serialized update process, e.g., a READDIR operation. Partitioning during the read operation should be avoided because partitioning of the /home directory causes the entries of the /home directory to be shuffled around and may further cause an entry within the /home directory to be reported to the operating system 230 more than once or none at all.

According to one embodiment, partitioning during a read operation is avoided by using a read counter 222 in the file system 220. The read counter 222 may increment each time there is a serialized update read request. For example, the read counter 222 is incremented twice if two read requests are received, e.g., from two users. On the other hand, the read counter 222 is decremented for every read request that is completed. According to one embodiment, the partitioning is prevented as long as the read counter 222 value is more than zero. On the other hand, directory partitioning may take place if the read counter 222 has a value equal to zero.

It is appreciated that the use of a counter to determine whether a read operation is pending is exemplary and not intended to limit the scope of the present invention. For example, one or more flags may be used to convey analogous read status.

In this exemplary embodiment, it is assumed that the read counter 222 has a value equal to zero. Thus, the /home directory may be partitioned, as shown in FIG. 2B. In this exemplary embodiment, the /home directory may be partitioned in to three subdirectories, H1, H2, and H3. It is appreciated that the partitioning of the /home directory is pictorially represented as a tree structure. It is appreciated that in this exemplary embodiment, the maximum number of tree structure levels is two and the maximum number of nodes is three, as shown, but any number could be selected. Three subdirectories are created. However, the /home directory could also use fewer subdirectories if it was only partially partitioned (not shown). In other words, the actual partitioned /home directory may be different from a modeled fully partitioned /home directory that is always fully partitioned with the maximum number of allowed levels, and nodes. In this exemplary embodiment, the actual tree structure matches the modeled fully partitioned tree structure because the actual tree structure utilizes the maximum number of allowed levels and nodes.

The H1 subdirectory may include File 1, File 2, and Dir 1 in its first data block. The first data block in H1 is of size N and the remainder of the first data block is left empty since the number of entries is less than the size of the data block.

The H2 subdirectory may include File 3, File 4, Dir 2, . . . , File 7. The first data block of size N in the H2 subdirectory may be filled with entries until it is completely filled. The remainder of the entries is stored in subsequent data blocks, e.g., a second data block of size N, until all the entries in H2 subdirectory are accounted for. In this exemplary embodiment, the second data block of size N is partially filled with Files 5-7 that were left over and the remainder of the second data block is left empty.

The H3 subdirectory is similarly filled with its associated entries. For example, the H3 subdirectory may include Files 8-11. The first data block of size N in H3 subdirectory is completely filled with Files 8-11 with no entries left over.

Figure 2C:
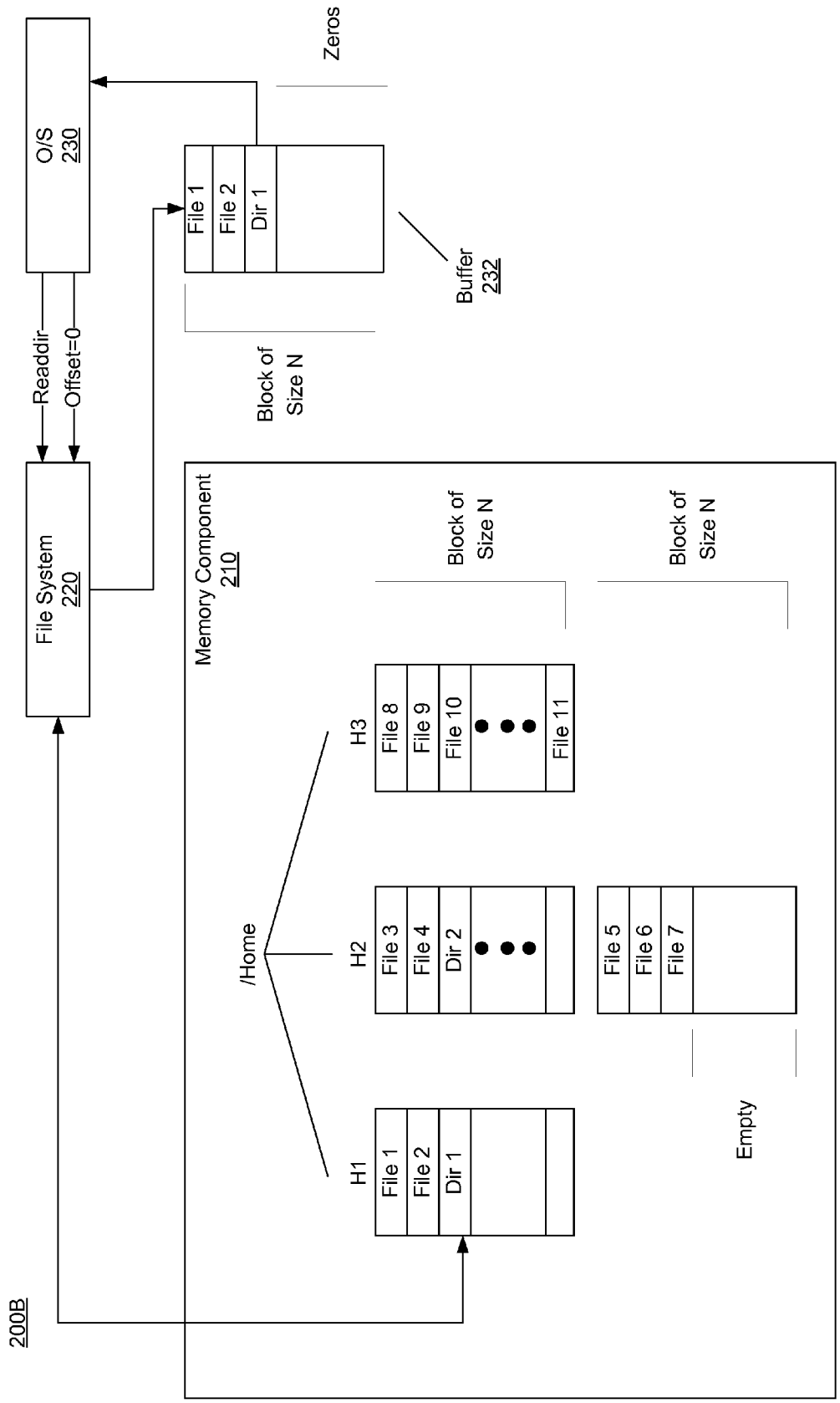

Referring now to FIG. 2C, incident to a serialized process, the file system 220 is shown reading a data block from the partitioned directory. It is appreciated that the file system 220 reads data blocks in a fully partitioned tree structure associated with a fully partitioned directory horizontally and in a round-robin fashion in accordance with embodiment of the present invention. For example, the file system 220 may begin reading a first data block of the H1 subdirectory followed by the first block of the H2 subdirectory and so on until the read operation wraps around to read the second data block of each subdirectory.

In this embodiment, the file system 220 receives a read request along with an offset from the operating system 230 incident to a serialized process, e.g., a READDIR operation. It is appreciated that the read request is received after the /home directory is partitioned, as shown in FIG. 2B. In this exemplary embodiment, the offset is equal to zero but may be any value.

The operating system 230 provides the buffer 232 for the read operation in this example. The buffer 232 may be of size N, as described above. The file system 220 utilizes the offset value and the size of the buffer 232 and the fully partitioned tree structure associated with the fully partitioned /home directory to identify a first data block from a subdirectory to be read.

In this example, zero is divided by the buffer size N. The result of the division and the fully partitioned tree structure associated with the fully partitioned /home directory indicates that the first data block from the first subdirectory H1 should be read. If the offset value was 2N instead of zero, the file system 220 would have identified the first data block of the H3 subdirectory to be read.

The file system 220 reads File 1, File 2, and Dir 1 from the first data block of H1 subdirectory. The read entries are placed in the buffer 232. In this exemplary embodiment, the number of read entries is less than the total size of the buffer 232. Accordingly, null values, e.g., zero values, are written for the remainder of the buffer 232.

Writing nulls for the remainder of the buffer 232 after the entire entries are read ensures that the offset value uniquely corresponds to a unique data block in a particular subdirectory when the /home directory is fully partitioned. For example, writing nulls for the remainder of the first read data block ensures that the updated offset of N corresponds to the first data block of the second subdirectory H2.

It is appreciated that writing of the null values is exemplary and not intended to limit the scope of the present invention. Writing null values in the buffer is one method of updating the offset value. It is therefore, appreciated that the remainder of the buffer 232 may be not be filled with null values since the offset value is updated by the file system 220.

The content of the buffer 232 is then read by the operating system 230. It is appreciated that the offset value is updated by the file system 220 and passed to the operating system 230. For example, the offset value is N because the previous offset value was zero and N entries are placed in the buffer.

Figure 2D:
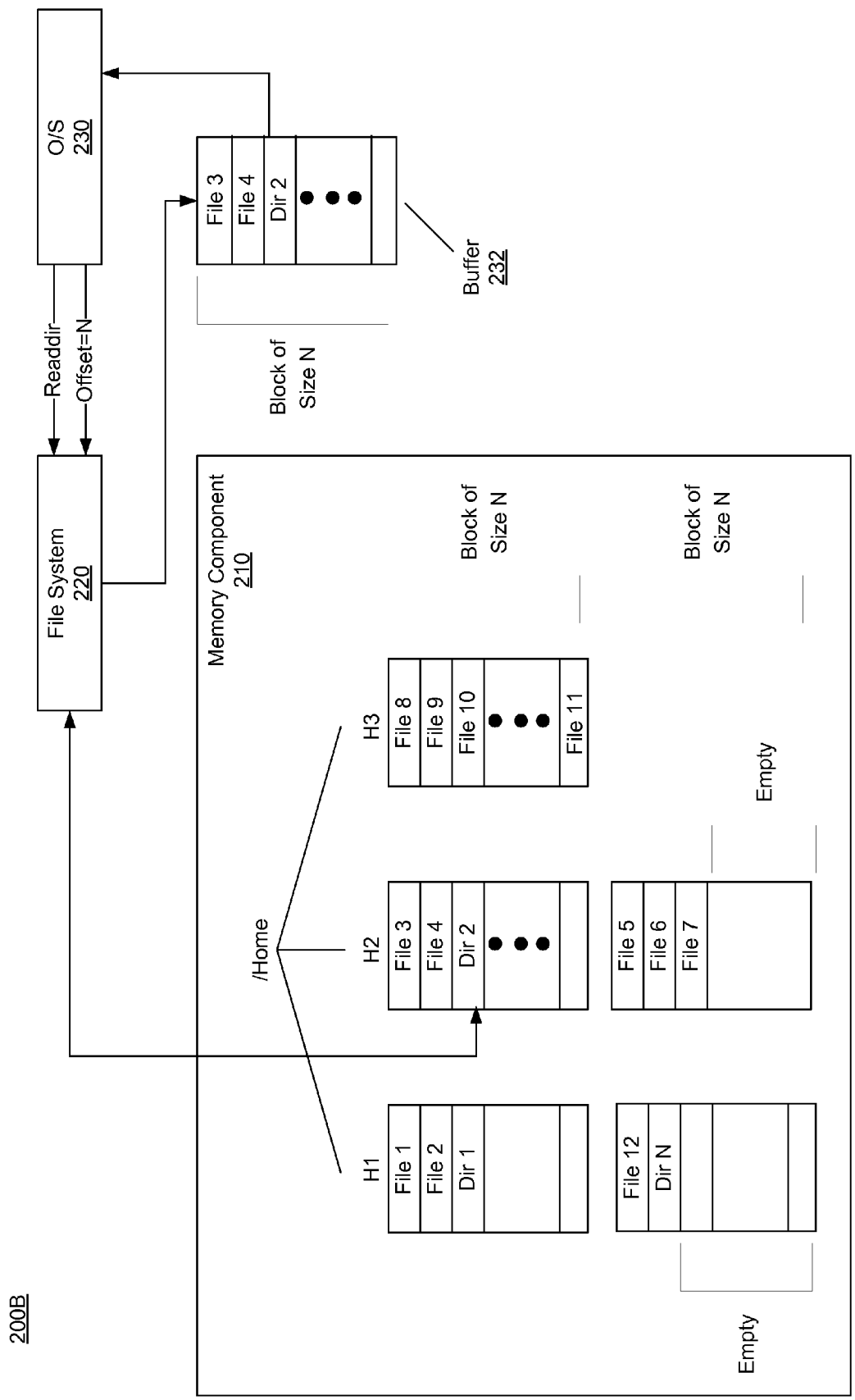

Referring now to FIG. 2D, continuing with the serialized process, the file system 220 receives the updated offset value N and a subsequent read operation request. The file system 220 uses the offset value N and divides it by the buffer 232 size N. Thus, the file system 220 identifies the first data block of the H2 subdirectory as the second data block to be read. In other words, the file system 220 reads the data block from a subdirectory immediately adjacent to the previously read subdirectory in the fully partitioned tree structure associated with the fully partitioned /home directory, one-at-a-time in a horizontally and in a round-robin fashion.

Accordingly, the first block of H2 subdirectory that includes File 3, File 4, Dir 2, etc., are read and placed in the buffer 232. It is appreciated that in this example, additional entries have been added to the H1 subdirectory during the time which the read from H2 subdirectory is taking place. For example, File 12 and Dir N are added to the H1 subdirectory. It is appreciated that new entries are added at the end of the subdirectory. Because the remaining portion of the first block of H1 directory was filled with nulls, the newly added files are added to the second data block of the H1 subdirectory.

The content of the buffer 232 may be read by the operating system 230. The offset value may be updated by the file system 220 and transmitted to the operating system 2309. Thus, the updated offset value is now 2N.

Figure 2E:
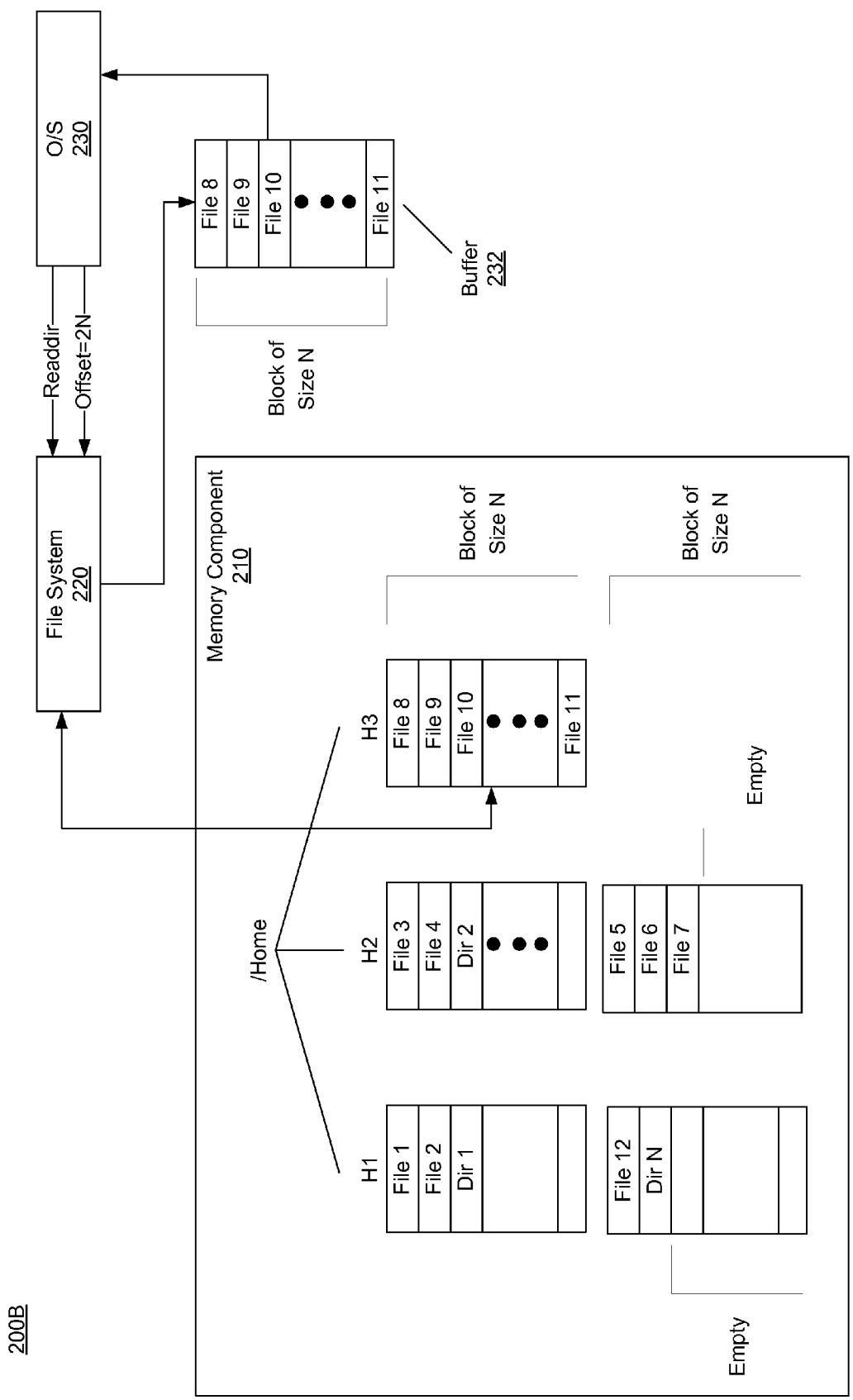

Referring now to FIG. 2E, the file system 220 receives the updated offset value 2N and another read operation request of the serialized process. The file system 220 uses the offset value 2N and divides it by the buffer 232 size N. Thus, the file system 220 identifies the first data block of the H3 subdirectory as the third data block to be read.

Accordingly, the first block of H3 subdirectory that includes Files 8-11 are read and placed in the buffer 232. The content of the buffer 232 may be read by the operating system 230 and the offset value may be updated by the file system 220 and subsequently to the update transmitted to the operating system 230 during a read from the buffer 232. Thus, the updated offset value is now 3N.

Figure 2F:
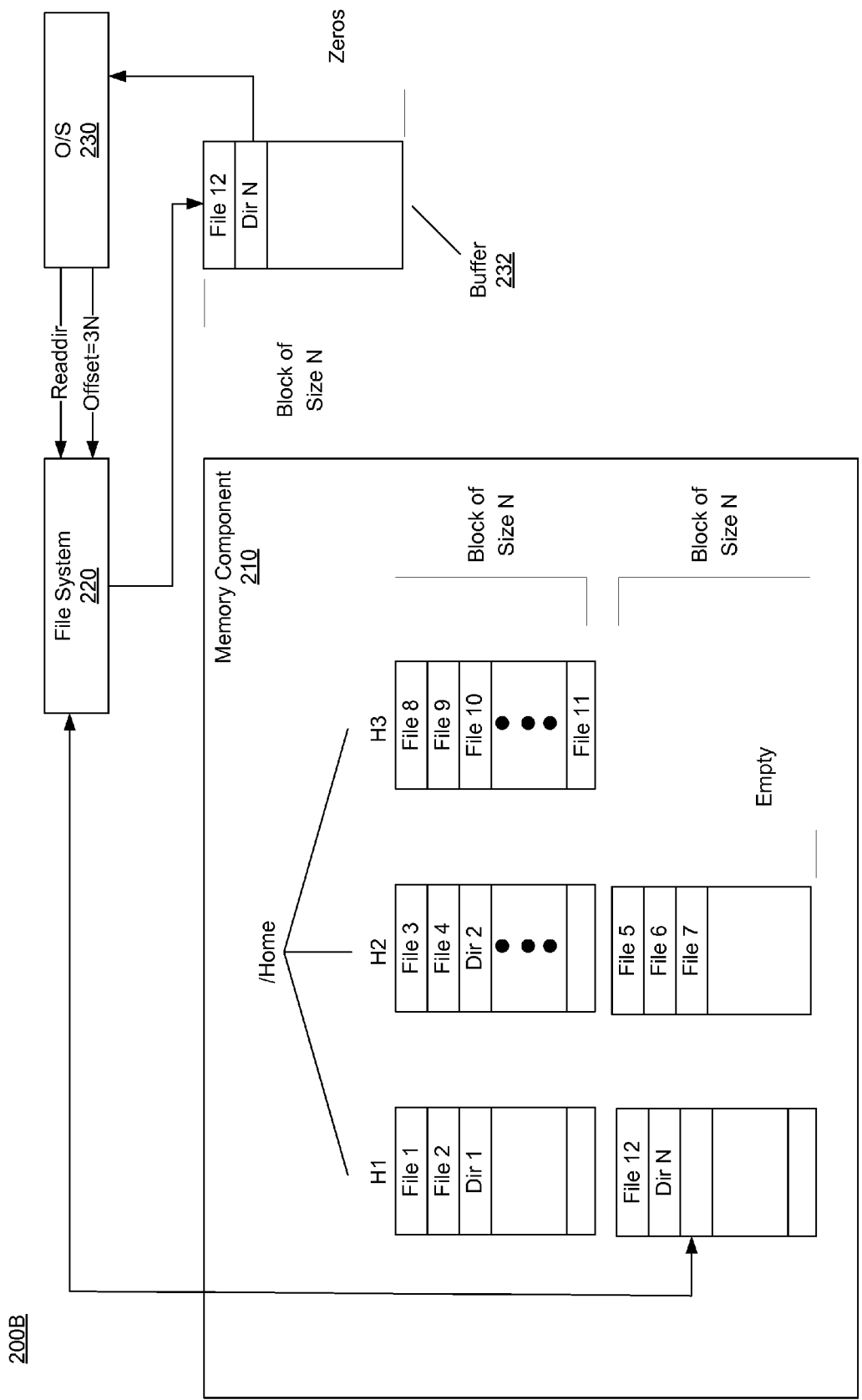

Referring now to FIG. 2F, the file system 220 receives the updated offset value 3N and another read operation request. The file system 220 uses the offset value 3N and divides it by the buffer 232 size N. Thus, the file system 220 identifies the second data block of the H1 subdirectory as the fourth data block to be read.

Accordingly, the second block of H1 subdirectory that includes newly added File 12 and Dir N are read and placed in the buffer 232. The number of read entries is less than the total size of the buffer 232. Accordingly, nulls are concatenated at the end of the newly added files to fill in the remainder of the buffer 232.

It is appreciated that in accordance with embodiments of the present invention the combination of reading data blocks horizontally and in a round-robin fashion advantageously increases the chances to capture and report the newly added content, as shown above. For example, if data blocks were read in a vertical fashion instead of horizontal, then after reading the first data block from H1 subdirectory, the newly added content File 12 and Dir N in the H1 subdirectory would have been missed because they were added after the first read was completed.

The content of the buffer 232 may be read by the operating system 230 and the offset value may be updated by the file system 220 and subsequently thereto transmitted to the operating system 230 during the read from the buffer 232. Thus, the updated offset value is now 4N.

Figure 2G:
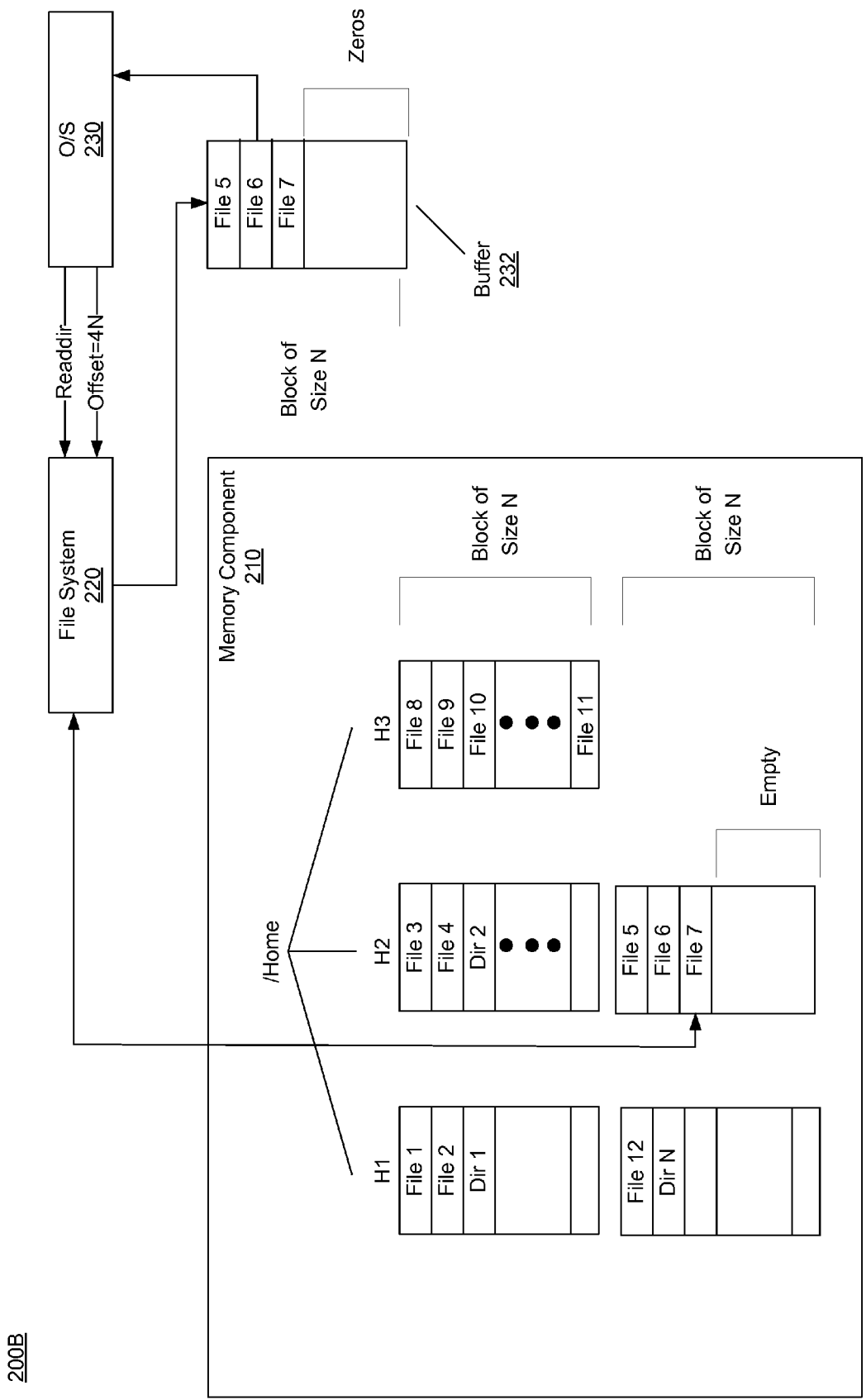

Referring now to FIG. 2G, the file system 220 receives the updated offset value 4N and another read operation request incident to the serialized process. The file system 220 uses the offset value 4N and divides it by the buffer 232 size N. Thus, the file system 220 identifies the second data block of the H2 subdirectory as the fifth data block to be read.

Accordingly, the second block of H2 subdirectory that includes Files 5-7 are read and placed in the buffer 232. The number of read entries is less than the total size of the buffer 232. Accordingly, the read content is concatenated with nulls to fill in the remainder of the buffer 232.

The content of the buffer 232 may be read by the operating system 230 and the offset value may be updated by the file system 220 and subsequently thereto transmitted to the operating system 230 during the read from the buffer 232. Thus, the updated offset value is now 5N. It is appreciated that the process continues until all entries of the fully partitioned /home directory are read advantageously only once. In this exemplary embodiment, the process terminates at this stage because all the entries of the fully partitioned /home directory are read once and only once.

Figure 3A:
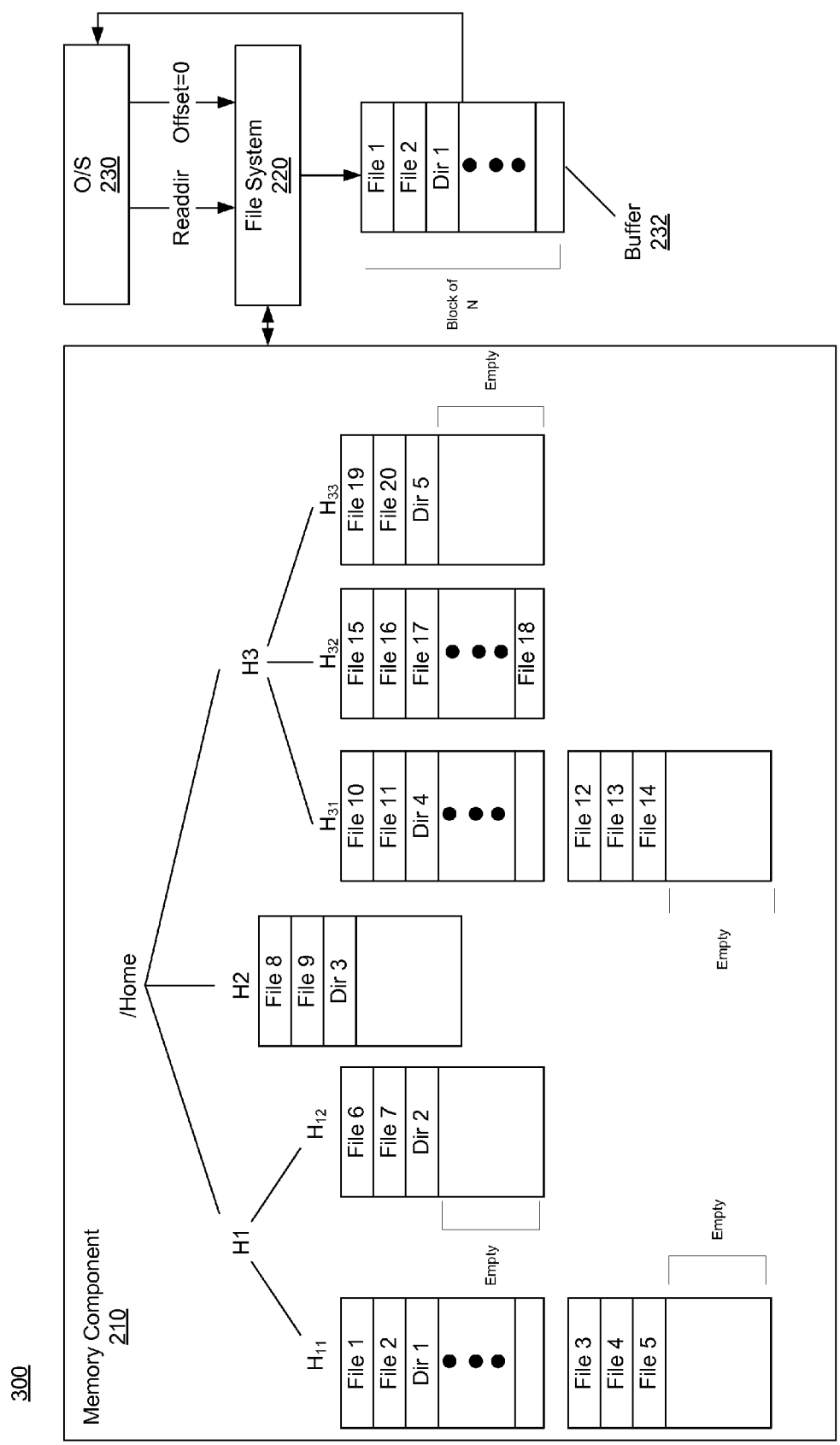
FIGS. 3A-3J show exemplary embodiments associated with reading entries of a partially partitioned directory pursuant to a serialized process in accordance with embodiments of the present invention.

Referring now to FIGS. 3A-3J, exemplary embodiments are shown associated with reading entries of a partially partitioned directory incident to a serialized thread in accordance with embodiments of the present invention. It is appreciated that system 300 operates substantially similar to that of FIGS. 2B-2G. Referring now to FIG. 3A, in this example the /home directory is only partially partitioned. The partially partitioned /home directory is referred to as "the actual partitioned" /home directory. In this exemplary embodiment, the maximum allowed number of levels associated with a fully partitioned directory is 3 and the maximum number of allowed subdirectories for each node is 3 to form a "fully partitioned" tree structure associated with a modeled "fully partitioned" /home directory. Accordingly, a maximum of 9 subdirectories are created in the fully partitioned /home directory.

In this example, the number of created subdirectories is six. Thus, the /home directory is only partially partitioned and therefore does not match the modeled fully partitioned /home directory. In other words, the H1 subdirectory includes only two subdirectories $H_{11}$ and $H_{12}$ and is missing a third subdirectory $H_{13}$ (not shown). Similarly, the H2 subdirectory has only one subdirectory, thereby missing two potential subdirectories. On the other hand, the H3 subdirectory contains three subdirectories $H_{31}$, $H_{32}$, and $H_{33}$, and is therefore not missing any subdirectories.

According to one exemplary embodiment, File 1, File 2, Dir 1, . . . , are placed in the first data block of the $H_{11}$ subdirectory while the remainder of the entries, Files 3-5, is placed in the second data block of the $H_{11}$ subdirectory. Files 6-7 and Dir 2 are placed in the first data block of the $H_{12}$ subdirectory.

File 8, File 9, and Dir 3 are placed in the first data block of the H2 subdirectory. File 10, File 11, Dir 4, are placed in the first data block of the $H_{31}$ subdirectory while the remainder of the entries, Files 12-14, are placed in the second data block of the $H_{31}$ subdirectory. Files 15-18 are placed in the first data block of the $H_{32}$ subdirectory while File 19, File 20, and Dir 5 are placed in the first data block of the $H_{33}$ subdirectory.

In this example, the file system 220 receives a read request incident to a serialized process along with an offset from the operating system 230. In this exemplary embodiment, the offset is equal to zero but may be any value.

The operating system 230 further provides the buffer 232 for the read operation. The buffer 232 may be of size N, as described above. The file system 220 utilizes the offset value and the size of the buffer 232 to identify the first block of data to be read in a fully partitioned /home directory. The file system 220 reads the identified first data block from the actual partitioned directory if the identified first data block is present in both the actual partitioned /home directory and in the modeled fully partitioned /home directory.

In this example, zero is divided by the buffer size N. The result of the division and the fully partitioned tree structure associated with the fully partitioned /home directory indicates that the first data block from the first subdirectory $H_{11}$ should be read. If the offset value was N instead of zero, the file system 220 would have identified the first data block of the $H_{12}$ subdirectory to be read, etc.

Accordingly, the file system 220 reads File 1, File 2, Dir 2, . . . , in the first data block of the $H_{11}$ subdirectory. The read data block is written into the buffer 232. The operating system 230 may read the content of the buffer and the updated offset value. It is appreciated that the offset value is updated by the file system 220. As presented above, the offset value is updated by N because the buffer 232 size is N.

Figure 3B:
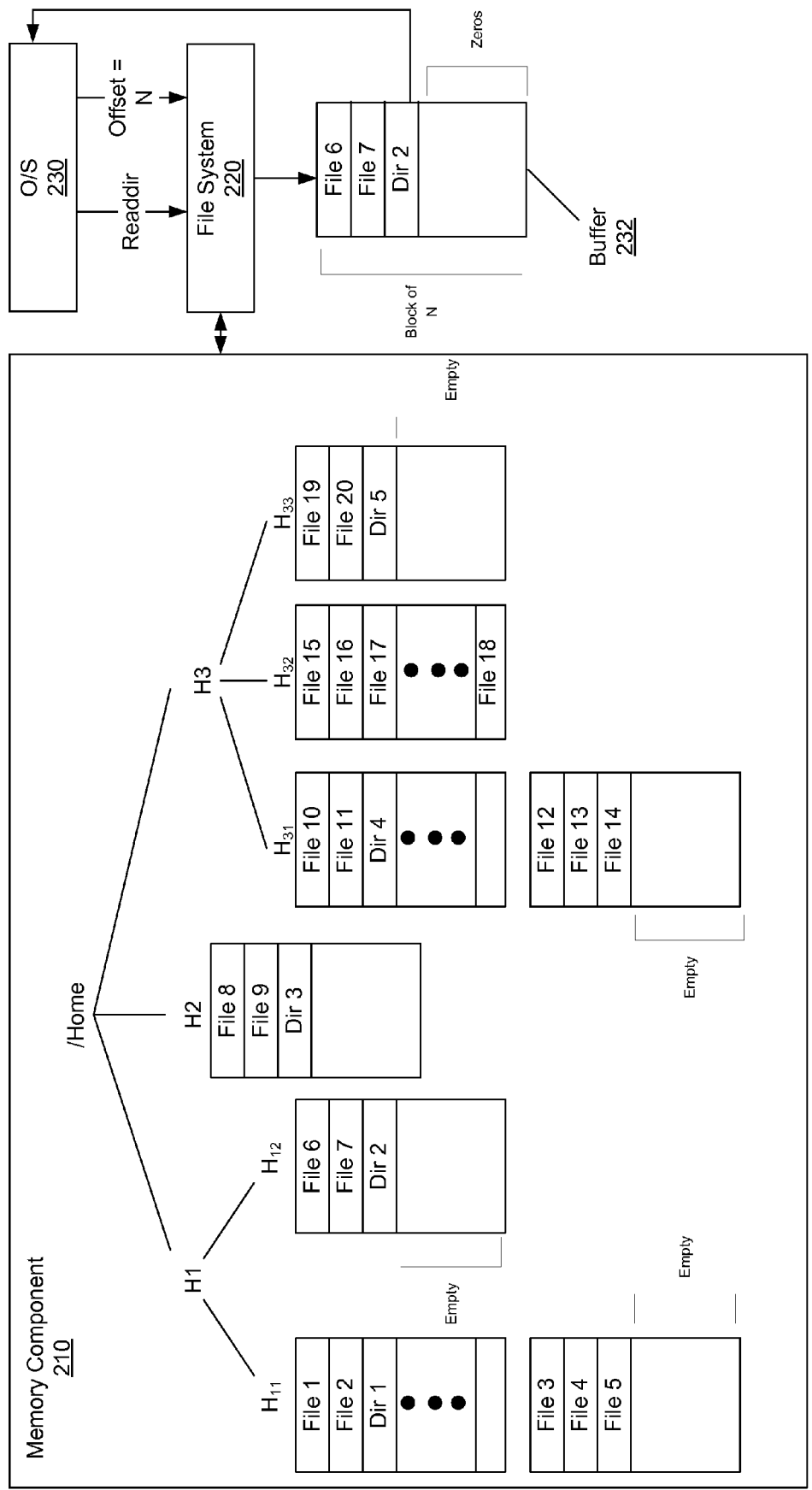

Referring now to FIG. 3B, the file system 220 receives the updated offset value N and another read operation request incident to the serialized process. The file system 220 uses the offset value N and divides it by the buffer 232 size N. Thus, the file system 220 identifies the first data block of the $H_{12}$ subdirectory as the second data block to be read. In other words, the file system 220 reads the data block from a subdirectory immediately adjacent to the previously read subdirectory in the fully partitioned tree structure associated with the fully partitioned /home directory, one-at-a-time in a horizontally and in a round-robin fashion.

Accordingly, the first block of $H_{12}$ subdirectory that includes File 6, File 7, and Dir 2, are read and written in to the buffer 232. In this exemplary embodiment, the number of read entries is less than the total size of the buffer 232. Accordingly, null values are written and appended to the bottom of the read files in order to fill in the remainder of the buffer 232.

Writing nulls for the remainder of the buffer 232 after the entire entries are read ensures that the offset value uniquely corresponds to a unique data block in a particular subdirectory when the /home directory is fully partitioned. For example, writing nulls for the remainder of the first read data block ensures that the updated offset of 2N corresponds to the first data block of the third subdirectory $H_{13}$ that has not been created.

In other words, the file system 220 reads File 6, File 7, and Dir 2 in the first data block of the $H_{12}$ subdirectory. The read data block is written into the buffer 232 and the remainder of the buffer 232 is concatenated with zeros. The operating system 230 may read the content of the buffer and further reads the updated offset value. As presented above, the offset value is updated by N because the buffer 232 size is N.

Figure 3C:
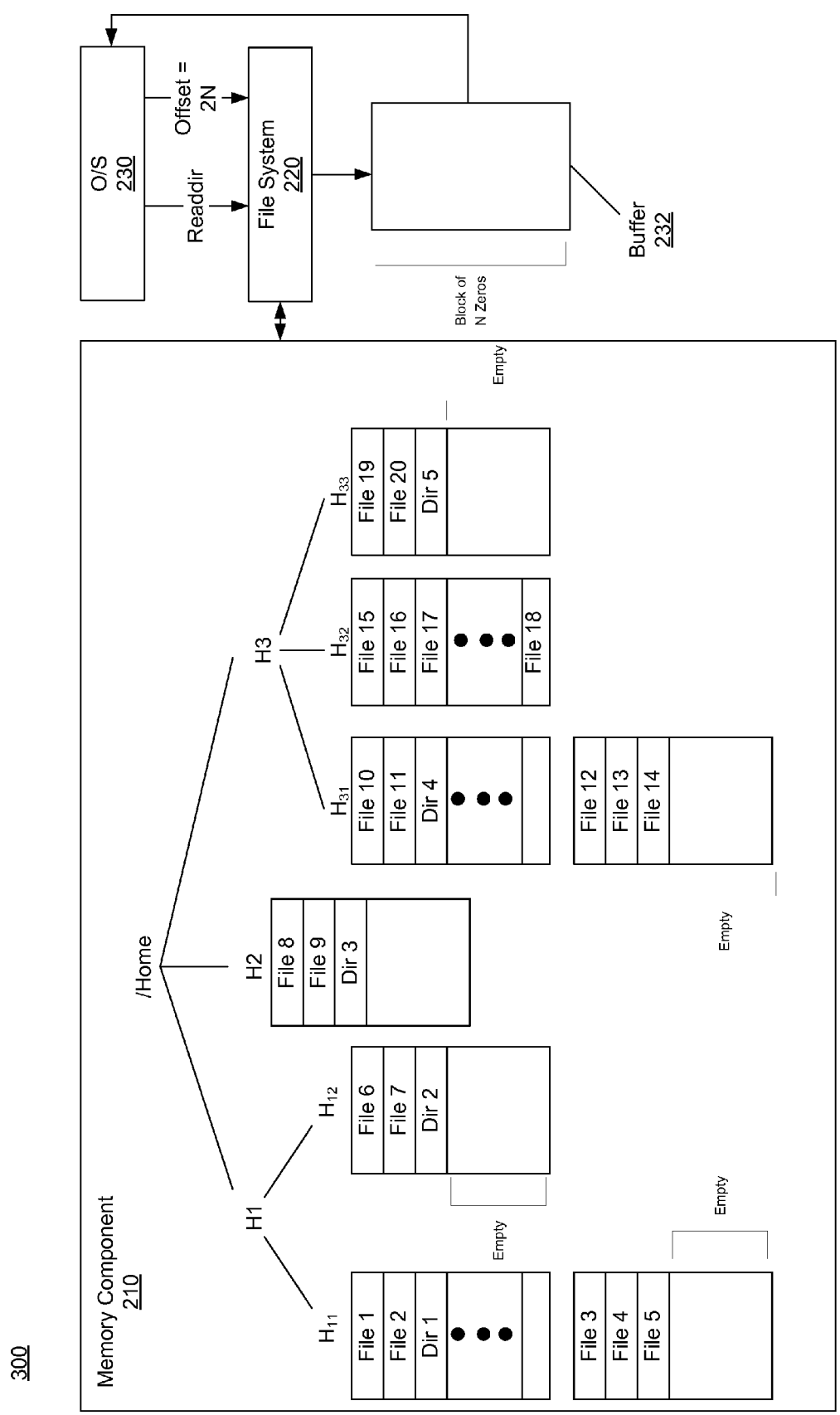

Referring now to FIG. 3C, the file system 220 receives the updated offset value 2N and a read operation request. The file system 220 uses the offset value 2N and divides it by the buffer 232 size N. As a result, the file system 220 determines that the third data block to be read belongs to a subdirectory that has not been created, namely $H_{13}$. In other words, the data block to be read is the next data block to be read in the modeled fully partitioned tree structure associated with the modeled fully partitioned /home directory. The file system 220 writes a data block containing N number of nulls in the buffer 232 since this subdirectory does not exist in the actual directory. The operating system 230 reads the content of the buffer and further receives the updated offset value. It is appreciated that the offset value is updated by N by the file system 220.

Figure 3D:
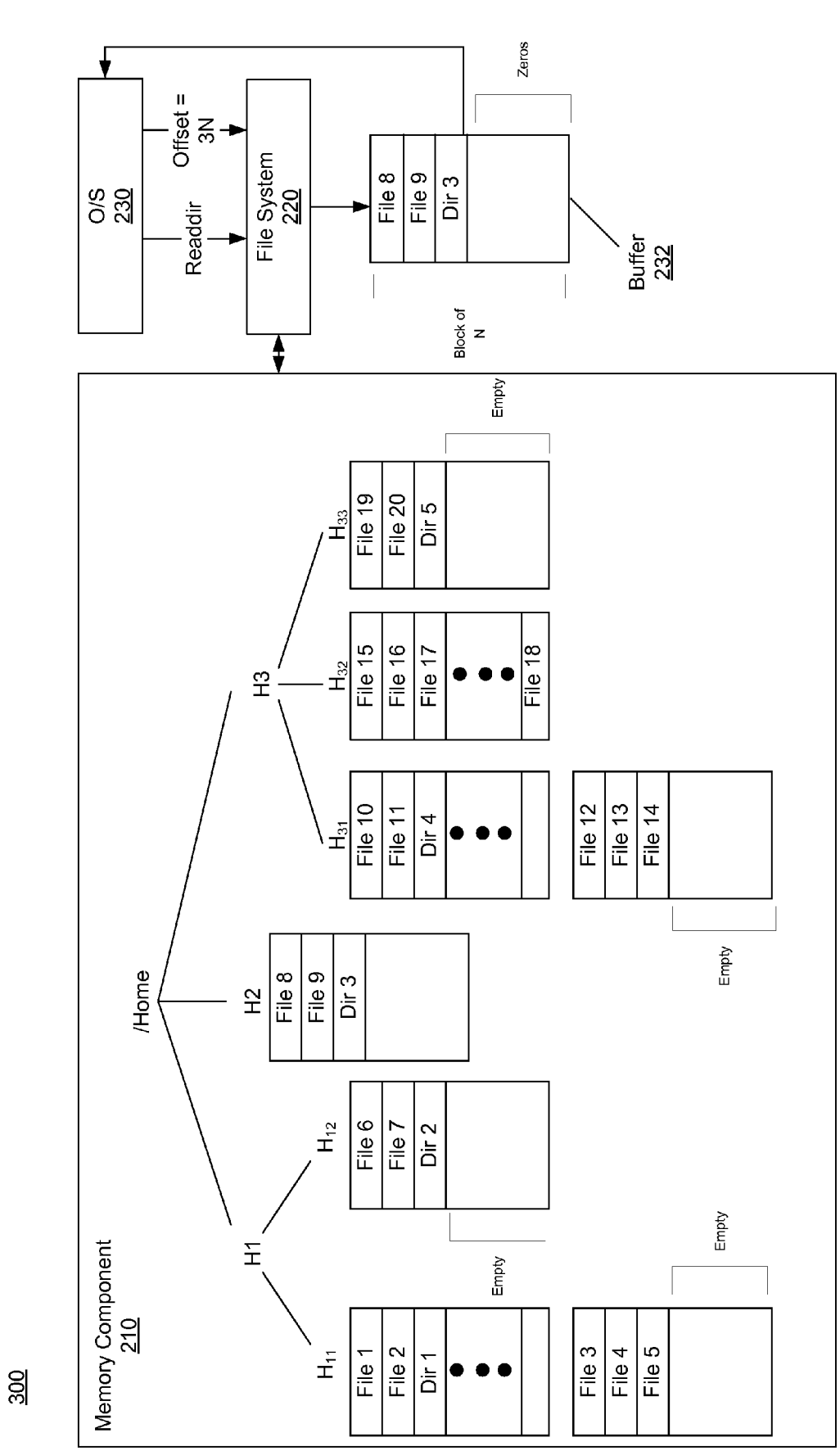

Referring now to FIG. 3D, the file system 220 receives the updated offset value 3N and another read operation request incident to the serialized process. The file system 220 uses the offset value 3N and divides it by the buffer 232 size N to identifies the fourth data block to be read. The block of data belonging to H2 is determined as the next block of data to be read. Thus, the file system 220 reads the content of the first data block of the H2 subdirectory. The read data block is written into the buffer 232. However, since the number of entries in the H2 subdirectory is less than the number of entries in the buffer 232, the remainder of the buffer 232 is concatenated with nulls. The content of the buffer 232 is read by the operating system 230 and the updated offset value that is updated by the file system 220.

Figure 3E:
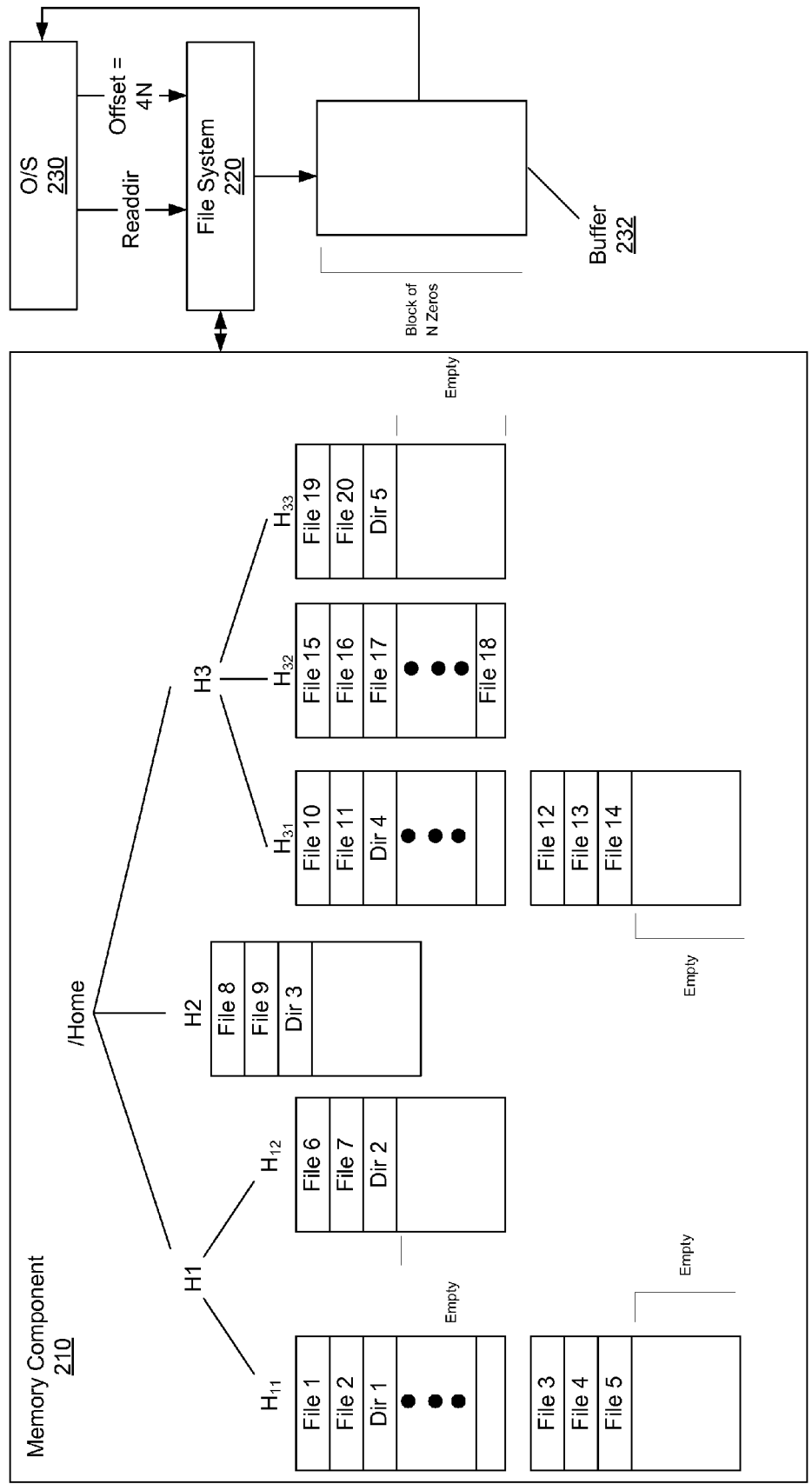
Figure 3F:
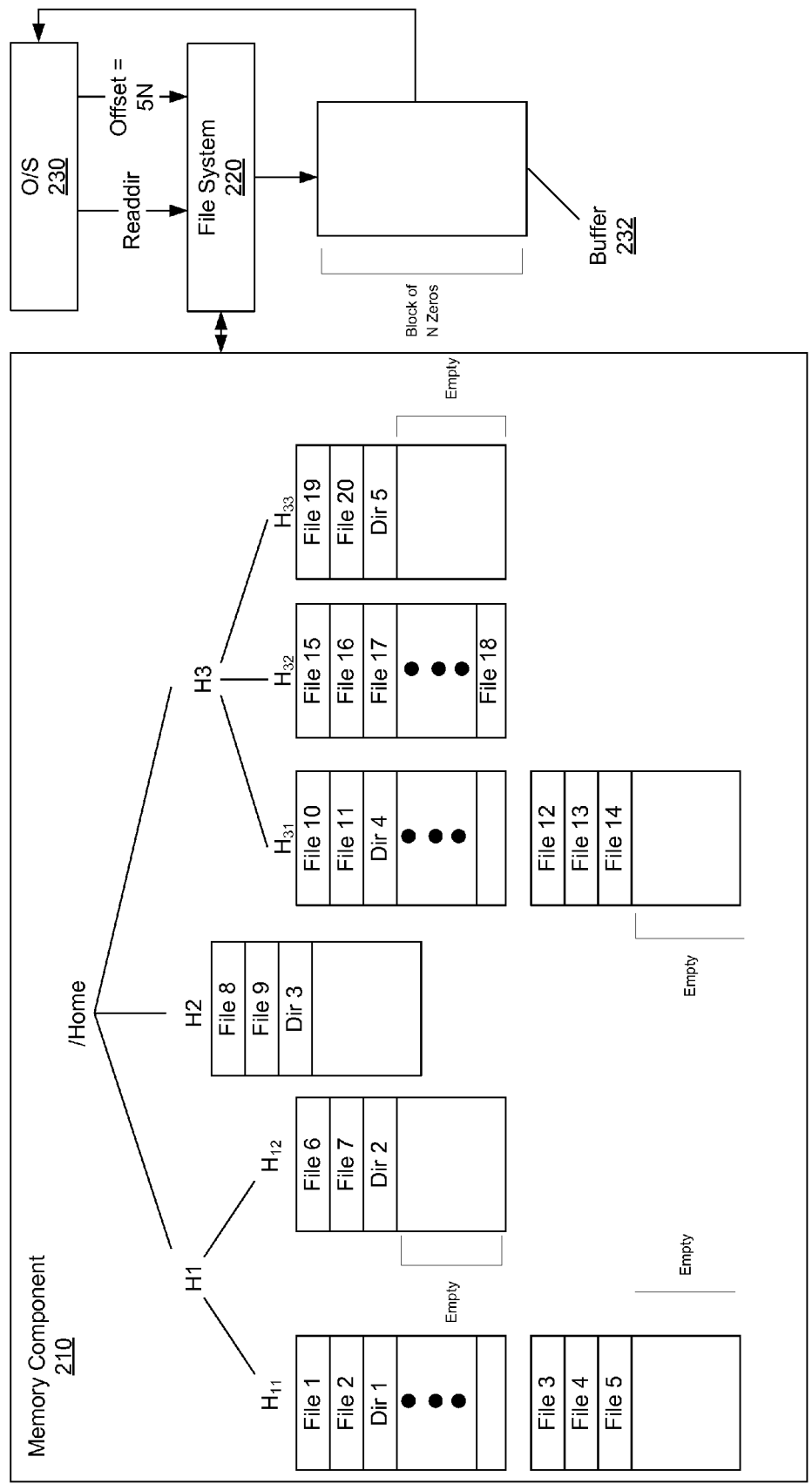

Referring now to FIGS. 3E and 3F, the file system 220 receives the updated offset value 4N and 5N respectively along with another read operation request. The file system 220 determines that the fifth and the sixth data blocks to be read are from subdirectories that have not been created, e.g., subdirectories $H_{22}$ and $H_{23}$, but are present in the modeled fully partitioned /home directory. Thus, the file system 220 writes a block of zeros in the buffer 232 for each of the data blocks corresponding to the missing subdirectory. The operating system 230 reads the content of the buffer respectively and further reads the updated offset value.

Figure 3G:
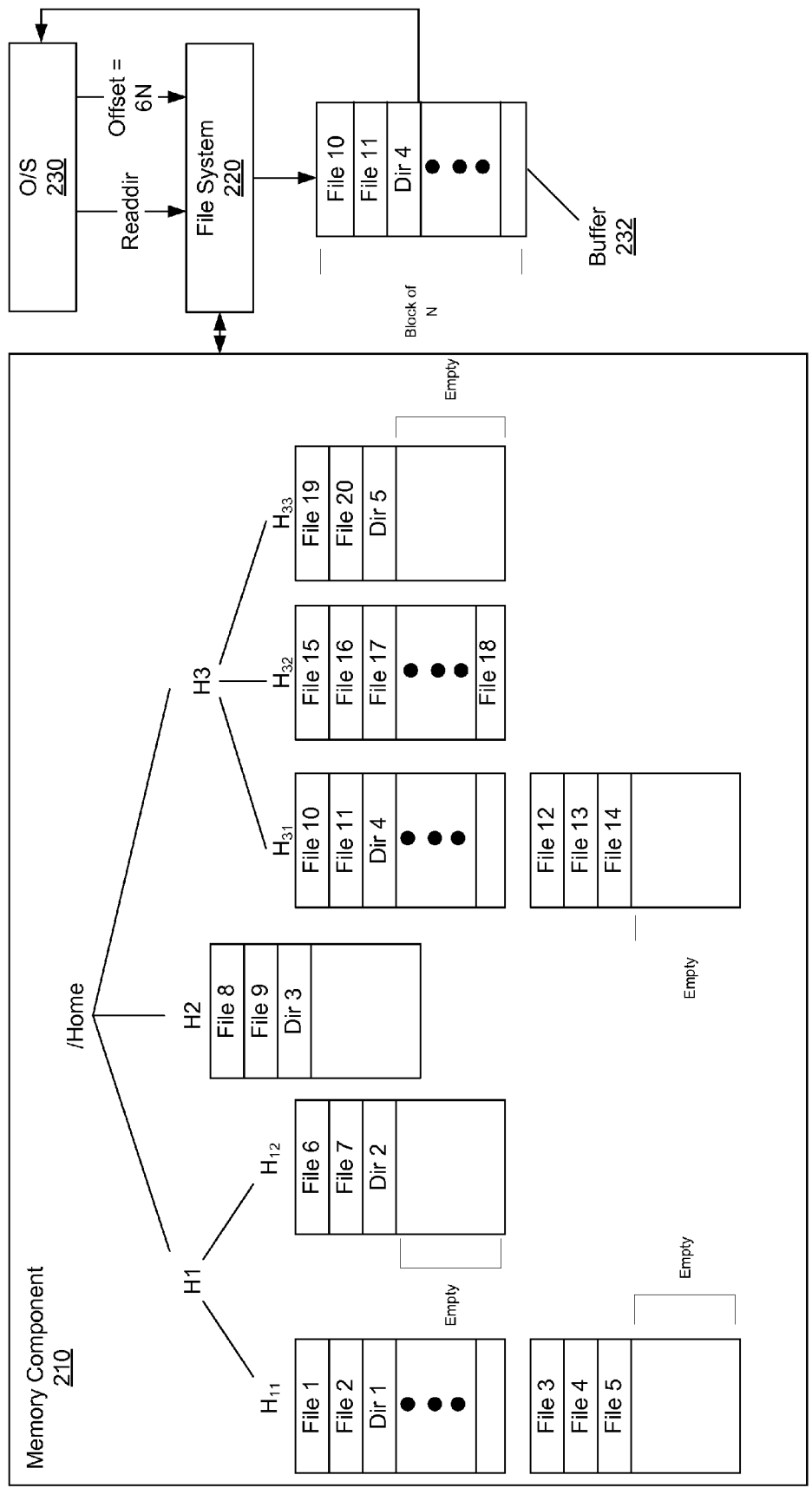

Referring now to FIG. 3G, the file system 220 receives the updated offset value 6N along with another read operation request incident to the serialized process. The file system 220 identifies the first data block of the $H_{31}$ subdirectory as the seventh data block to be read. Accordingly, the file system 220 writes the content of the first data block of the $H_{31}$ subdirectory into the buffer 232. The operating system 230 reads the content of the buffer 232 and further reads the updated offset value. The offset value is updated by the file system 220.

Figure 3H:
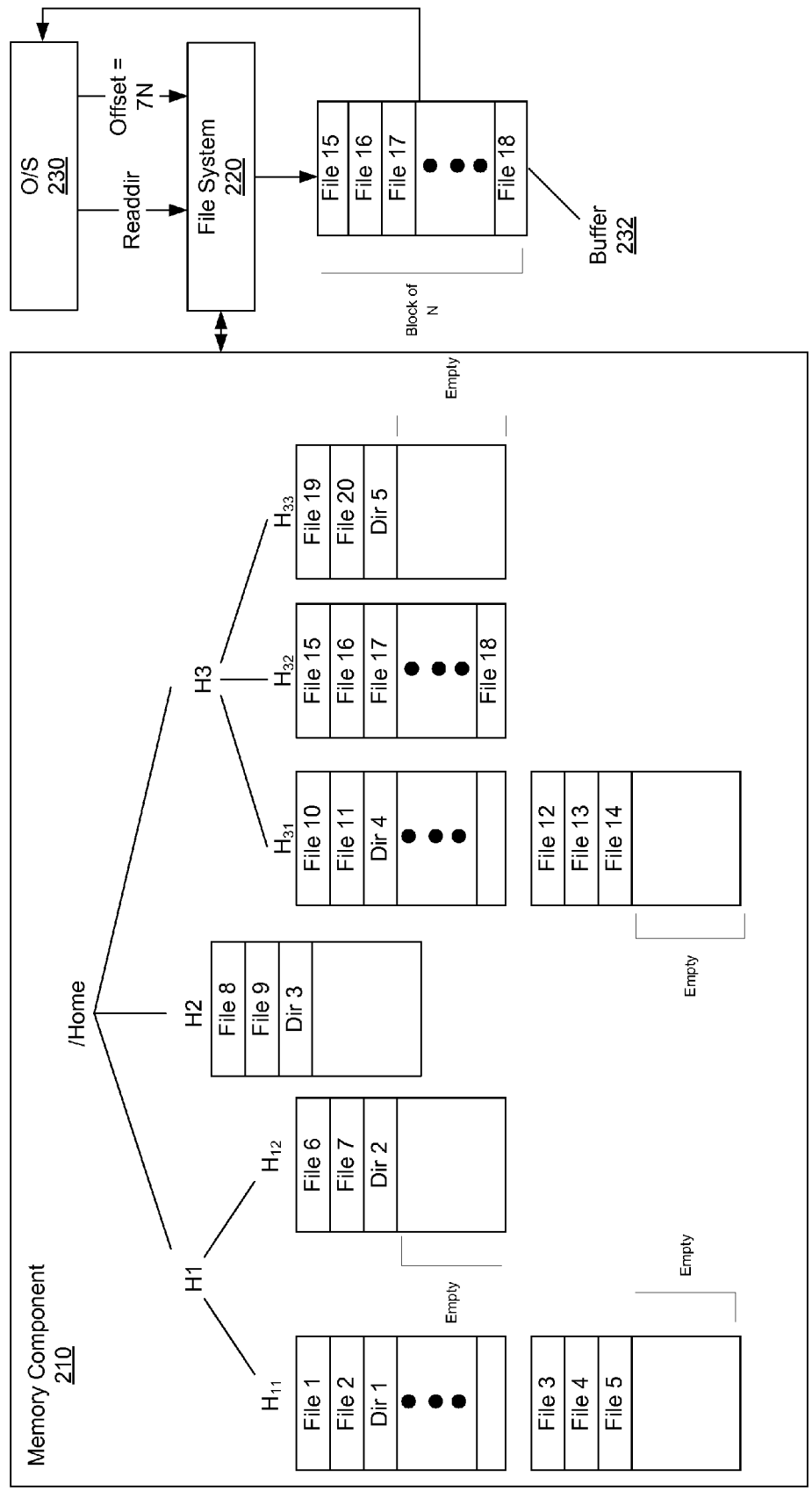

Referring now to FIG. 3H, the file system 220 receives the updated offset value 7N along with another read operation request. The file system 220 identifies the first data block of the $H_{32}$ subdirectory as the eighth data block to be read. Accordingly, the file system 220 writes the content of the first data block of the $H_{32}$ subdirectory into the buffer 232. The operating system 230 reads the content of the buffer 232 and further reads the updated offset value. The offset value is updated by the file system 220

Figure 3I:
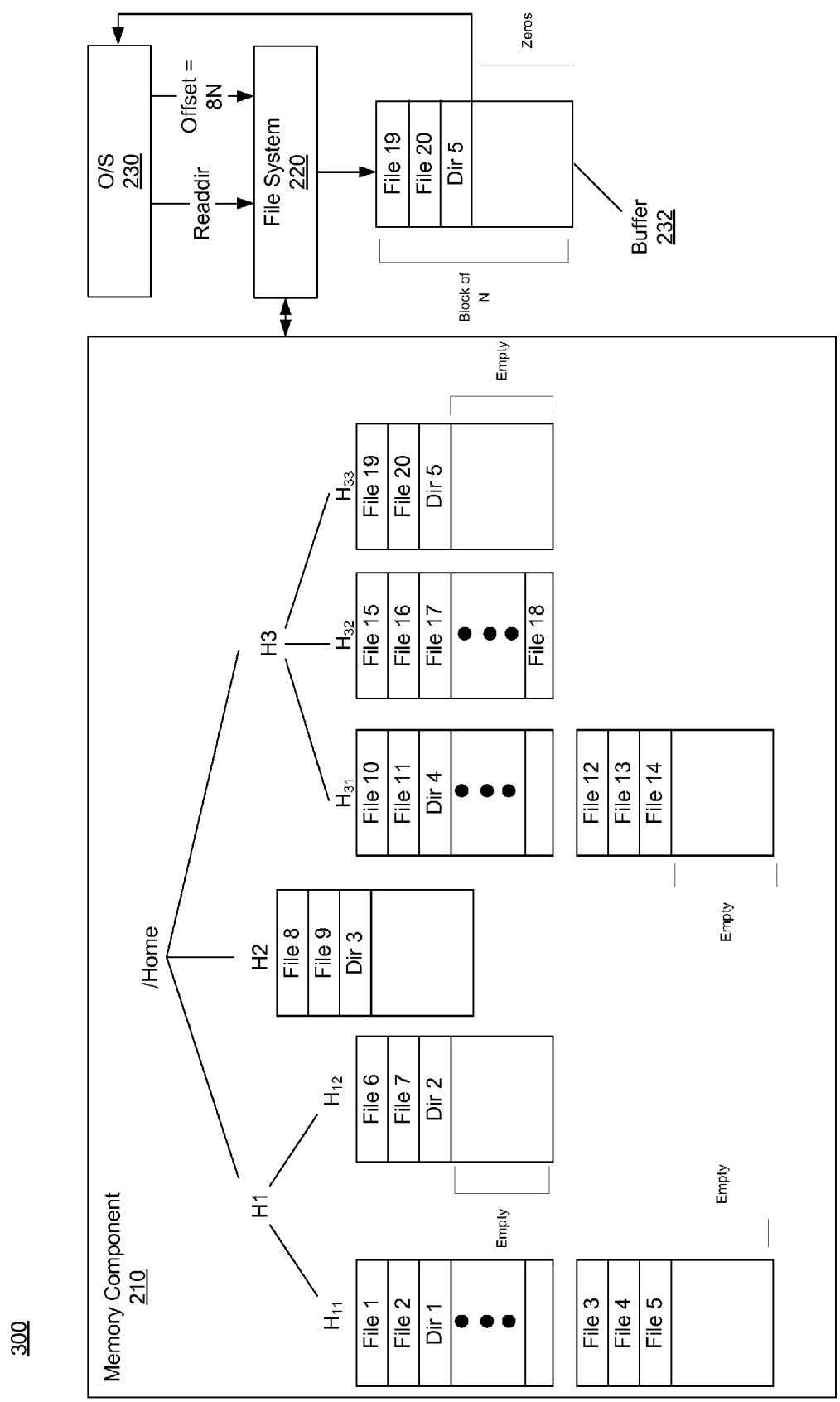

Referring now to FIG. 3I, the file system 220 receives the updated offset value 8N along with another read operation request. The file system 220 identifies the first data block of the $H_{33}$ subdirectory as the ninth data block to be read. Accordingly, the file system 220 writes the content of the first data block of the $H_{33}$ subdirectory into the buffer 232. The remainder of the buffer 232 is filled with nulls because the number of read entries is less than the number of entries in the buffer 232. The operating system 230 reads the content of the buffer 232 and further reads the updated offset value. The offset value is updated by the file system 220.

Figure 3J:
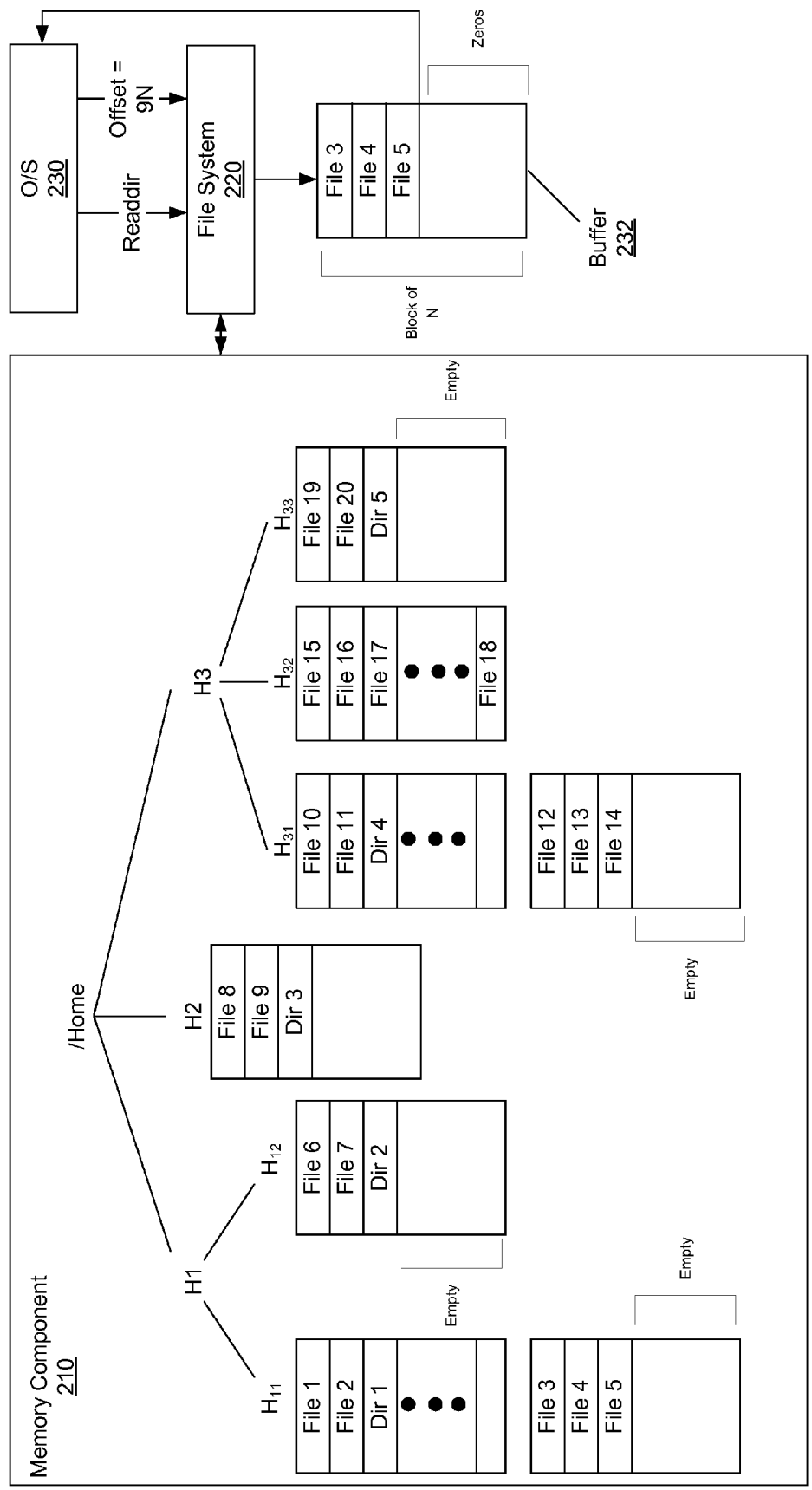

Referring now to FIG. 3J, the file system 220 receives the updated offset value 9N along with a read operation request. The file system 220 reads content both horizontally and in a round-robin fashion in accordance with embodiments of the present invention, as described above. Thus, the file system 220 identifies the second data block of the $H_{11}$ subdirectory as the tenth data block to be read. Accordingly, the file system 220 writes the content of the second block of the $H_{11}$ subdirectory into the buffer 232. It is appreciated that the remainder of the buffer 232 is concatenated with nulls since the number of entries in the second data block of the $H_{11}$ subdirectory is less than the number of entries in the buffer.

The operating system 230 reads the content of the buffer 232 and further reads the update offset value. The offset value is updated by the file system 220, as presented above. It is appreciated that the process described by FIGS. 3A-3J continues until every entry within the partially partitioned /home directory is advantageously read only once in accordance with embodiments of the present invention. It is further appreciated that the requirements of ensuring that every entry in the /home directory is read only once is extended via embodiments of the present invention to a partially partitioned directory.

Figure 4:
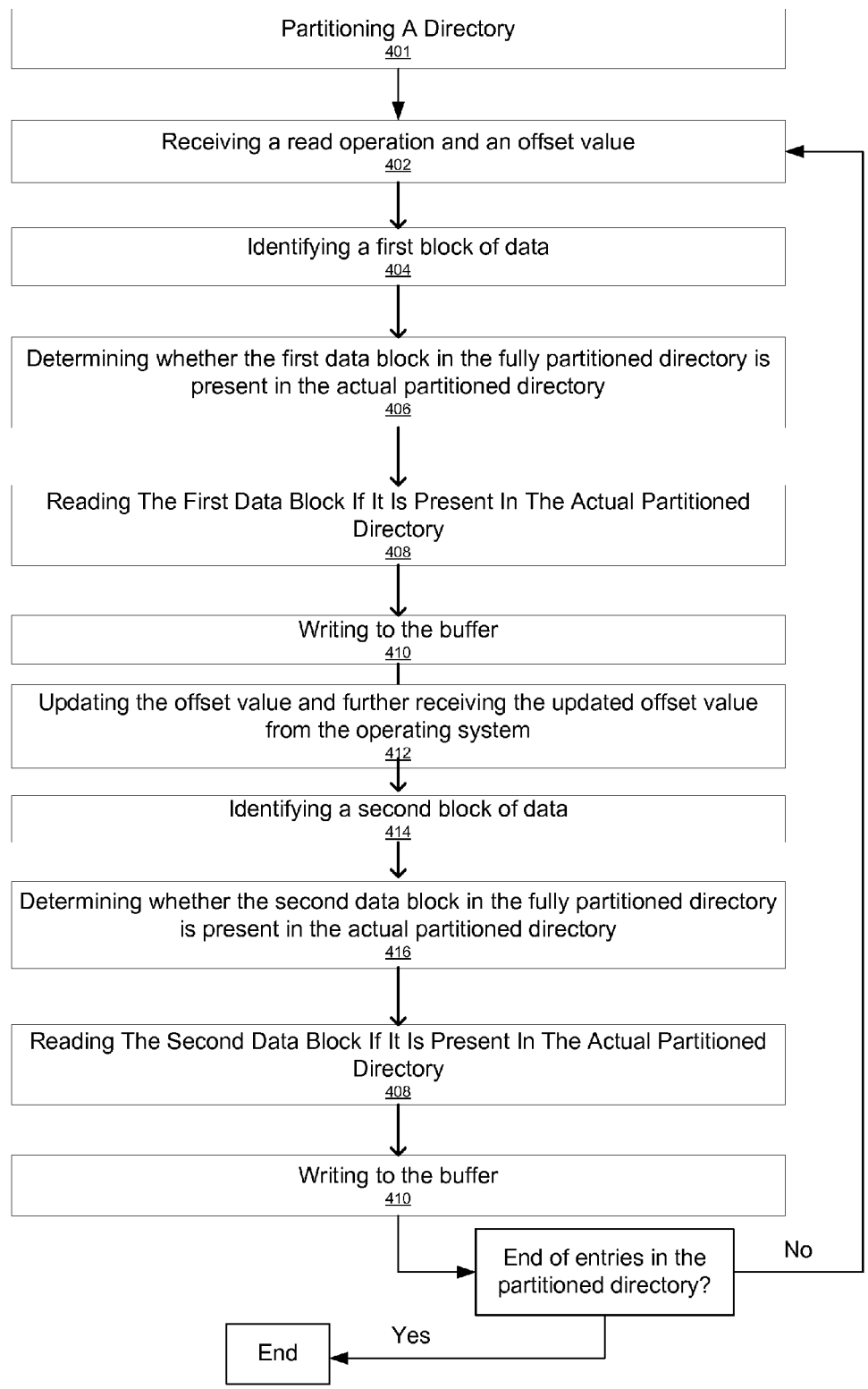
FIG. 4 shows an exemplary flow diagram of a partitioned directory read process in accordance with one embodiment of the present invention.

FIG. 4 shows a flow diagram of an exemplary process 400 for reading a partitioned directory (the actual partitioned directory) incident to a serialized process in accordance with one embodiment of the present invention. At step 401, a directory, e.g., /home directory, is partitioned to create the actual partitioned directory. It is appreciated that step 401 is optional, as the directory may already be in a partitioned form.

At step 402, a read operation and an offset value are received from an operating system. At step 404, a first data block in a modeled fully partitioned directory is identified. It is appreciated that the fully partitioned directory is a model directory that is partitioned based on the maximum number of allowed levels and the maximum number of allowed nodes and subdirectories. The first data block is associated with a subdirectory in the fully partitioned directory. Identifying the first data block is based on the offset value and the size of the buffer allocated by the operating system, as presented above.

At step 406, it is determined whether the first data block in the modeled fully partitioned directory is present in the actual partitioned directory. For example, it may be determined that a data block associated with $H_{13}$ subdirectory in the modeled fully partitioned directory is not present in the actual partitioned directory shown in FIGS. 3A-3J. On the other hand, it may be determined that a data block associated with the $H_{11}$ subdirectory in the fully partitioned directory is present in the actual partitioned directory, as shown in FIGS. 3A-3J.

At step 408, the first data block associated with the actual partitioned directory is read if the first data block in the fully partitioned directory is present in the actual partitioned directory. At step 410, the file system writes into the buffer. For example, null values are written in the buffer if the first data block in the fully partitioned directory, e.g., data block corresponding to $H_{13}$ subdirectory, is not present in the actual portioned directory.

On the other hand, the read first data block is written into the buffer if the first data block in the modeled fully partitioned directory is present in the actual partitioned directory. Moreover, the read first data block that is being written to the buffer is concatenated with nulls if the number of read entries is less than the number of entries in the buffer. The offset value is updated by the file system and transmitted to the operating system.

At step 412, the updated offset value is received from the operating system. It is appreciated that the updated offset value may be accompanied with another read request from the operating system. At step 414, a second data block in a fully partitioned directory is identified. The second data block is associated with a second subdirectory in the fully partitioned directory where the second subdirectory is immediately adjacent to the first subdirectory in a fully partitioned tree structure associated with the modeled fully partitioned directory. Identifying the second data block is based on the offset value and the size of the buffer allocated by the operating system, as presented above.

At step 416, it is determined whether the second data block in the modeled fully partitioned directory is present in the actual partitioned directory. The process to make the determination at step 416 is substantially similar to that of step 406.

At step 418, the second data block associated with the actual partitioned directory is read if the second data block in the fully partitioned directory is present in the actual partitioned directory. At step 420, the file system writes into the buffer. For example, zeros are written in the buffer if the second data block in the fully partitioned directory, e.g., data block associated with $H_{23}$ subdirectory, is not present in the actual portioned directory.

On the other hand, the read second data block is written into the buffer if the second data block in the fully partitioned directory is present in the actual partitioned directory. Moreover, the read second data block that is being written to the buffer is concatenated with zeros if the number of read entries is less than the number of entries in the buffer.

A determination is made whether all the entries of the partitioned directory have been read. The process ends if all the entries are read. On the other, this process continues back to step 402 until the entire directory is read. As such, the next offset value is received and the next data block to be read is identified and written to the buffer until all entries of the partitioned /home directory are read.

In accordance with embodiments of the present invention, advantageously, each entry of the actual partitioned directory is read once and only once.

Figure 5:
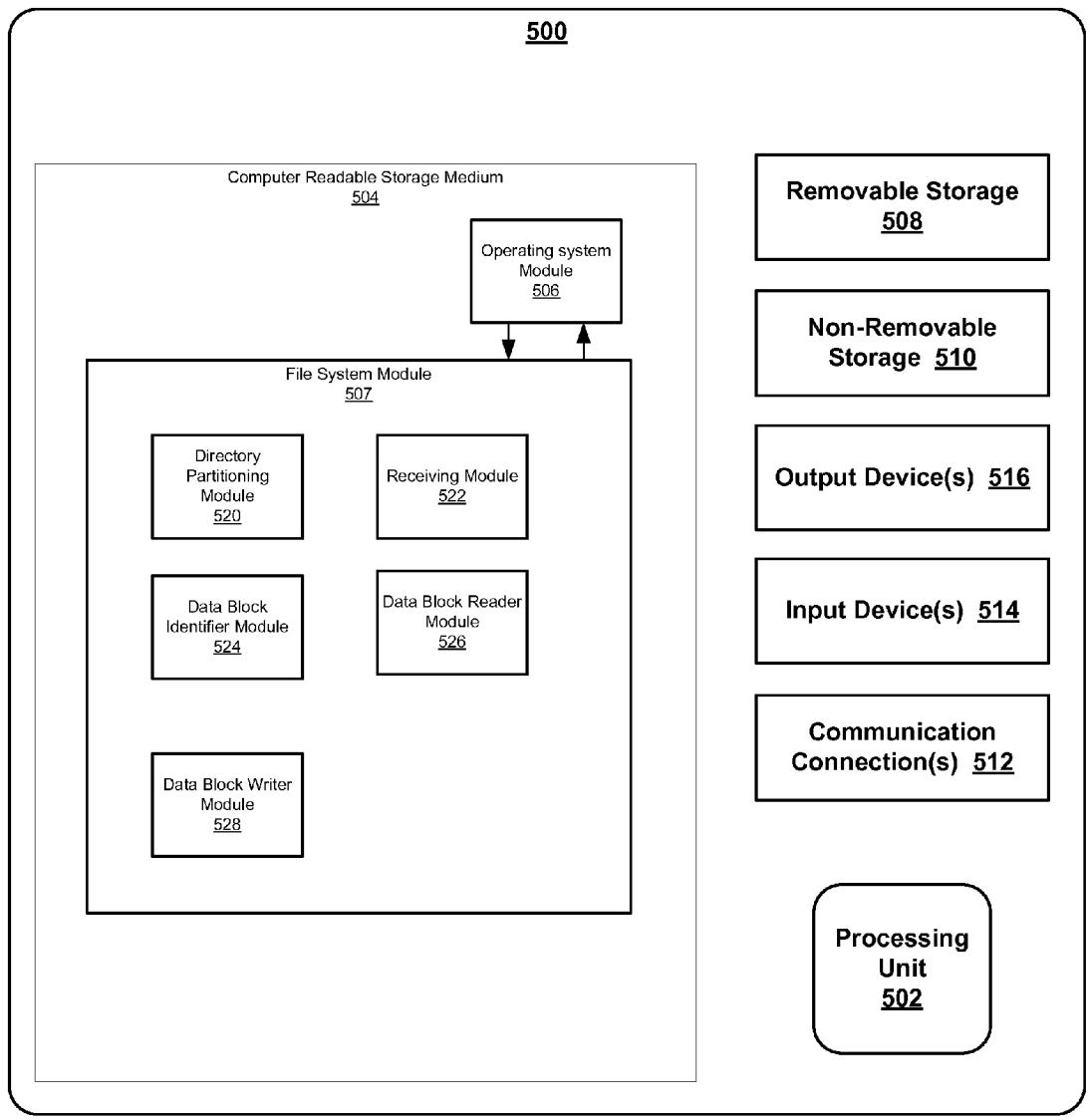
FIG. 5 shows a block diagram of an exemplary computer system in accordance with one embodiment of the present invention.

Referring now to FIG. 5, a block diagram of an exemplary computer system in accordance with one embodiment of the present invention is shown. With reference to FIG. 5, an exemplary system module for implementing embodiments includes a general purpose computing system environment, such as computing system environment 500. Computing system environment 500 may include, but is not limited to, servers (e.g., servers 106a-b), desktop computers, laptops, tablet PCs, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed facilitates the determination of whether a directory is primed for partitioning according to embodiments of the present invention (e.g., process 400).

Additionally, computing system environment 500 may also have additional features/functionality. For example, computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may allow computing system environment 500 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a keyboard, mouse, pen, voice input device, touch input device, remote control, etc. Output device(s) 516 such as a display, speakers, etc. may also be included. All these devices are well known in the art and are not discussed at length.

In one embodiment, computer readable storage medium 504 includes a file system module 507 which includes a directory partitioning module 520, a receiving module 522, a data block identifier module 524, a data block reader module 526, and a data block writer module 528. The file system module 507 communicates with an operating system module 506.

The directory partitioning module 520 determines whether a directory is primed for partitioning and partitions the directory in response thereto according to embodiments of the present invention. The receiving module 522 receives read operation requests and offset values from the operating system module 506 incident to a serialized thread, e.g., a READ-DIR operation. The data block identifier module 524 identifies a block of data to be read based on the offset value and further based on the size of the buffer provided by the operating system module 506 in accordance with embodiments of the present invention. The data block reader module 526 reads the identified data block in accordance with embodiments of the present invention. The data writer module 528 writes the read data block to the buffer provided by the operating system module 506 in accordance with embodiments of the present invention.

Figure 6:
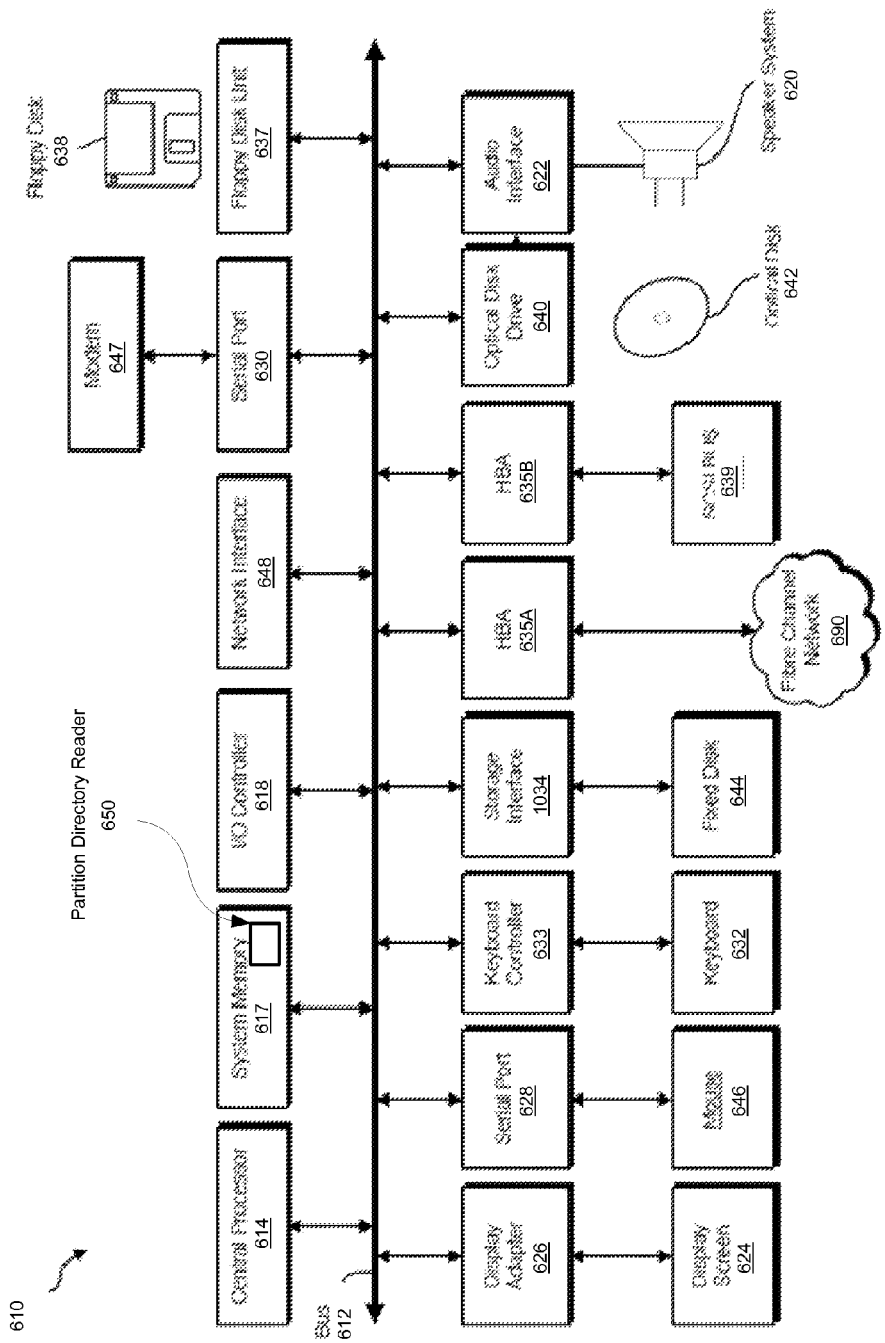
FIG. 6 shows a block diagram of another exemplary computer system in accordance with one embodiment of the present invention.

Referring now to FIG. 6, a block diagram of another exemplary computer system in accordance with one embodiment of the present invention is shown. FIG. 6 depicts a block diagram of a computer system 610 suitable for implementing the present disclosure. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612). System memory 617 includes partition directory reader module 650 which is operable to read entries of the actual partitioned directory once and only once according to embodiments of the present invention.

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of reading data from an actual partitioned directory of a hierarchical structure, said method comprising:
    receiving a first read operation and a first offset value from an operating system;
    identifying a first data block in a modeled fully partitioned directory, wherein said first data block is associated with a first subdirectory, and wherein said identifying is based on said first offset value and further based on a predetermined number of entries associated with a buffer;
    determining whether said first data block in said fully partitioned directory is present in said actual partitioned directory;
    writing null values in said buffer if said first data block in said fully partitioned directory is not present in said actual partitioned directory; and
    writing said first data block associated with said actual partitioned directory into said buffer if said first data block in said fully partitioned directory is present in said actual partitioned directory.

2. The method as described in claim 1 further comprising:
    subsequent to said writing, receiving a second read operation with a second offset value from said operating system;
    identifying a second data block in said fully partitioned directory, wherein said second data block is associated with a second subdirectory, wherein said second subdirectory is selected based on a horizontal node traversal through a node level of said first subdirectory, and wherein said identifying said second data block is based on said second offset value and further based on said predetermined number of entries;
    determining whether said second data block in said fully partitioned directory is present in said actual partitioned directory;
    writing null values in said buffer if said second data block in said fully partitioned directory is not present in said actual partitioned directory; and
    writing said second data block associated with said actual partitioned directory in said buffer if said second data block in said fully partitioned directory is present in said actual partitioned directory.

3. The method as described in claim 2, wherein said writing said second data block further comprises:
    writing null values for a remainder of said buffer if a number of read entries in association with said second data block of said actual partitioned directory is less than said predetermined number of entries associated with said buffer.

4. The method as described in claim 2, wherein said first and said second read operations are part of a serialized process.

5. The method as described in claim 4, wherein content of said actual partitioned directory is read only once responsive to said serialized process.

6. The method as described in claim 1, wherein said writing said
    writing nulls for a remainder of said buffer if a number of read entries in association with said first data block of said actual partitioned directory is less than said predetermined number of entries associated with said buffer.

7. The method as described in claim 1 further comprising:
    prior to said receiving said first read operation, partitioning a directory into said actual partitioned directory provided no read operation involving said directory is pending.

8. A non-transitory computer readable storage medium having stored thereon, computer executable instructions that, if executed by a computer system cause the computer system to perform a method of reading data from an actual partitioned directory of a hierarchical structure, said method comprising:
    receiving a first read operation and a first offset value from an operating system;
    identifying a first data block in a modeled fully partitioned directory, wherein said first data block is associated with a first subdirectory, and wherein said identifying is based on said first offset value and further based on a predetermined number of entries associated with a buffer;
    determining whether said first data block in said fully partitioned directory is present in said actual partitioned directory;
    writing null values in said buffer if said first data block in said fully partitioned directory is not present in said actual partitioned directory; and
    reading said first data block associated with said actual partitioned directory if said first data block in said fully partitioned directory is present in said actual partitioned directory and writing said first data block associated with said actual partitioned directory in said buffer in response to said reading.

9. The non-transitory computer readable storage medium as described in claim 8, wherein said method further comprises:
    receiving a second read operation with a second offset value from said operating system;
    identifying a second data block in said fully partitioned directory, wherein said second data block is associated with a second subdirectory, wherein said second subdirectory is selected based on a horizontal node traversal through a node level of said first subdirectory, and wherein said identifying is based on said second offset value and further based on a predetermined number of entries;
    determining whether said second data block in said fully partitioned directory is present in said actual partitioned directory;

writing null values in said buffer if said second data block in said fully partitioned directory is not present in said actual partitioned directory; and reading said second data block associated with said actual partitioned directory if said second data block in said fully partitioned directory is present in said actual partitioned directory and writing said second data block associated with said actual partitioned directory in said buffer in response to said reading said second data block.

10. The non-transitory computer readable storage medium as described in claim 9, wherein said writing said second data block further comprises:

writing null values for a remainder of said buffer if a number of read entries in association with said second data block of said actual partitioned directory is less than said predetermined number of entries associated with said buffer.

11. The non-transitory computer readable storage medium as described in claim 9, wherein said first and second read operations are part of a serialized process.

12. The non-transitory computer readable storage medium as described in claim 11, wherein content of said partitioned directory is read only once during said serialized process.

13. The non-transitory computer readable storage medium as described in claim 8, wherein said writing said first data block comprises:

writing null values for a remainder of said buffer if a number of read entries in association with said first data block of said actual partitioned directory is less than said predetermined number of entries associated with said buffer.

14. The non-transitory computer readable storage medium as described in claim 8, wherein said method further comprises:

prior to said receiving, partitioning a directory into said actual partitioned directory if no read operation involving said directory is pending.

15. A system for reading data from an actual partitioned directory, said system comprising:

a first memory component operable to store an operating system thereon;

a buffer associated with said operating system, wherein said buffer has a predetermined number of entries;

a second memory component operable to store said actual partitioned directory;

a third memory component operable to store a file system thereon, wherein said file system is operable to:

receive first read operation and a first offset value from said operating system;

identify a first data block in a modeled fully partitioned directory, wherein said first data block is associated with a first subdirectory, and wherein said identifying is based on said first offset value and further based on a predetermined number of entries associated with said buffer;

determine whether said first data block in said fully partitioned directory is present in said actual partitioned directory;

write null values in said buffer if said first data block in said fully partitioned directory is not present in said actual partitioned directory; and write said first data block associated with said actual partitioned directory in said buffer if said first data block in said fully partitioned directory is present in said actual partitioned directory.

16. The system as described in claim 15, wherein said operating system in response to written data in said buffer provides a second read operation with a second offset value, and wherein said file system is further operable to:

identify a second data block in a fully partitioned directory, wherein said second data block is associated with a second subdirectory, wherein said second subdirectory is selected based on a horizontal node traversal through a node level of said first subdirectory and wherein said identifying said second data block is based on said second offset value and further based on said predetermined number of entries;

determine whether said second data block in said fully partitioned directory is present in said actual partitioned directory;

write null values in said buffer if said second data block in said fully partitioned directory is not present in said actual partitioned directory; and write said second data block associated with said actual partitioned directory in said buffer if said second data block in said fully partitioned directory is present in said actual partitioned directory.

17. The system as described in claim 16, wherein said file system is further operable to write null values for a remainder of said buffer if a number of entries read in association with said second data block is less than said predetermined number of entries.

18. The system as described in claim 16, wherein said first and second read operations are part of a serialized process.

19. The system as described in claim 18, wherein content of said partitioned directory is read only once during said serialized process.

20. The system as described in claim 15, wherein said file system is further operable to write null values for a remainder of said buffer if a number of entries read in association with said first data block is less than said predetermined number of entries.

* * * * *